United States Patent
Yang et al.

(10) Patent No.: US 12,457,145 B2
(45) Date of Patent: Oct. 28, 2025

(54) COMMUNICATING NONUNIFORM SOURCES USING SYSTEMATIC CODES

(71) Applicant: QUALCOMM Incorporated, San Diego, CA (US)

(72) Inventors: Wei Yang, San Diego, CA (US); Mahmoud Taherzadeh Boroujeni, San Diego, CA (US); Pinar Sen, San Diego, CA (US); Amira Alloum, Boulogne Billancourt (FR); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 43 days.

(21) Appl. No.: 18/620,869

(22) Filed: Mar. 28, 2024

(65) Prior Publication Data
US 2025/0310172 A1    Oct. 2, 2025

(51) Int. Cl.
*H04L 27/34*    (2006.01)

(52) U.S. Cl.
CPC ...... *H04L 27/3483* (2013.01); *H04L 27/3477* (2013.01)

(58) Field of Classification Search
CPC .......................... H04L 27/3483; H04L 27/3477
See application file for complete search history.

(56) References Cited

U.S. PATENT DOCUMENTS

| | | | |
|---|---|---|---|
| 2019/0253191 A1* | 8/2019 | Jeong | H04L 1/0071 |
| 2019/0280720 A1* | 9/2019 | Myung | H03M 13/1165 |
| 2020/0313773 A1* | 10/2020 | Torbatian | H04L 1/0052 |

FOREIGN PATENT DOCUMENTS

| | | | |
|---|---|---|---|
| CN | 115987404 A | * | 4/2023 |

* cited by examiner

*Primary Examiner* — Freshteh N Aghdam
(74) *Attorney, Agent, or Firm* — Holland & Hart LLP

(57) ABSTRACT

Methods, systems, and devices for wireless communications are described. A user equipment (UE) generates multiple systematic bits for a message, where the systematic bits are nonuniformly distributed over a time period such that a first bit value has a first probability of occurrence during the time period and a second bit value has a second probability that is greater than the first probability of the occurrence. The UE modulates the systematic bits according to an asymmetric modulation rule such that the first bit value corresponds to a first constellation point on a constellation graph and the second bit value corresponds to a second constellation point that is relatively closer to a center of the constellation graph than the first constellation point based on the second probability being greater than the first probability. The UE transmits the message including systematic bits modulated according to the asymmetric modulation rule.

30 Claims, 14 Drawing Sheets

COMMUNICATING NONUNIFORM SOURCES USING SYSTEMATIC CODES

FIELD OF TECHNOLOGY

The following relates to wireless communications, including communicating nonuniform sources using systematic codes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Wireless communication systems may include the use of various modulation schemes for modulating transmissions. For example, quadrature phase-shift keying (QPSK), binary phase-shift keying (BPSK), quadrature amplitude modulation (QAM), pulse amplitude modulation (PAM), among other modulation schemes may be used to modulate an amplitude, phase, or other attribute of a waveform for an uplink or downlink signal to indicate different bits of information.

SUMMARY

The described techniques relate to improved methods, systems, devices, and apparatuses that support communicating nonuniform sources using systematic codes. For example, the described techniques provide for using systematic code on nonuniform source bits.

A transmitter, such as a user equipment (UE) or a network entity, may use different modulation schemes for systematic bits and parity bits when modulating nonuniform source bits, such that the transmitter uses asymmetric modulation to modulate the nonuniformly distributed systematic bits while modulating uniformly distributed parity bits using symmetric modulation (e.g., quadrature phase-shift keying (QPSK) or binary phase-shift keying (BPSK)). For example, on a constellation graph for modulation, the nonuniform systematic bit associated with a greater probability may be mapped to a lower energy point and the nonuniform systematic bit associated with a lower probability may be mapped to a greater energy point, where the constellation points are asymmetric with respect to the center of the constellation graph (e.g., −1 and 0.3 rather than −1 and 1). In other words, the greater probability bit may be mapped to an inner constellation point and the lower probability bit may be mapped to an outer constellation point with respect to the center point (0,0) of the constellation graph, in an asymmetric manner. In some examples, the transmitter may measure the empirical distribution of the information payload (e.g., ratio of 0 bits and 1 bits in the payload of nonuniform source bits) and modulate using the asymmetric modulation according to the empirical distribution. The transmitter may transmit an indication of the empirical distribution to the receiver to be used for decoding. In some examples, the asymmetric modulation for modulating the nonuniform systematic bits may applied to higher order modulation and mapped, such as by mapping bits to constellation points on the I-axis and Q-axis of an IQ plot of the constellation graph.

A method for wireless communications by a transmitter (e.g., a UE or a network entity) is described. The method may include generating a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence, modulating the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability, and transmitting the message including the set of multiple systematic bits modulated according to the asymmetric modulation rule.

A transmitter for wireless communications is described. The transmitter may include one or more memories storing processor executable code, and one or more processors coupled with the one or more memories. The one or more processors may individually or collectively be operable to execute the code to cause the transmitter to generate a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence, modulate the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability, and transmit the message including the set of multiple systematic bits modulated according to the asymmetric modulation rule.

Another transmitter for wireless communications is described. The transmitter may include means for generating a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence, means for modulating the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability, and means for transmitting the message including the set of multiple systematic bits modulated according to the asymmetric modulation rule.

A non-transitory computer-readable medium storing code for wireless communications is described. The code may include instructions executable by one or more processors to generate a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence, modulate the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability, and transmit the message including the set of multiple systematic bits modulated according to the asymmetric modulation rule.

Some examples of the method, transmitters, and non-transitory computer-readable medium described herein may further include operations, features, means, or instructions for mapping the first bit value to the first probability and mapping the second bit value to the second probability, where the first bit value corresponds to the first constellation point and the second bit value corresponds to the second constellation point based on mappings.

Some examples of the method, transmitters, and non-transitory computer-readable medium described herein may further include operations, features, means, or instructions for computing a measure of the first probability of the first bit value and a measure of the second probability of the second bit value and transmitting an indication of the measure of the first probability and the measure of the second probability.

In some examples of the method, transmitters, and non-transitory computer-readable medium described herein, transmitting the indication may include operations, features, means, or instructions for transmitting the indication of the measure of the first probability and the measure of the second probability using a quantity of bits less than the set of multiple systematic bits.

Some examples of the method, transmitters, and non-transitory computer-readable medium described herein may further include operations, features, means, or instructions for estimating the first probability of the first bit value and the second probability of the second bit value and transmitting an indication of the estimated first probability and the estimated second probability.

In some examples of the method, transmitters, and non-transitory computer-readable medium described herein, the set of multiple systematic bits nonuniformly distributed include one or more bits indicating an acknowledgement (ACK) and one or more bits indicating a negative acknowledgement (NACK) associated with a hybrid automatic repeat request (HARQ) feedback process.

Some examples of the method, transmitters, and non-transitory computer-readable medium described herein may further include operations, features, means, or instructions for modulating the set of multiple parity bits according to a symmetric modulation rule such that a third bit value may have a third probability of occurrence during the time period and a fourth bit value may have a fourth probability of occurrence during the time period that may be equal to the third probability of the occurrence, where the third bit value corresponds to a third constellation point on the constellation graph and the fourth bit value corresponds to a fourth constellation point on the constellation graph that may be equal distance to a center of the constellation graph as the third constellation point based on the fourth probability being equal to the third probability, and transmitting the message including the set of multiple parity bits modulated according to the symmetric modulation rule.

In some examples of the method, transmitters, and non-transitory computer-readable medium described herein, the set of multiple systematic bits may be modulated onto a first axis of the constellation graph and the set of multiple parity bits may be modulated onto a second axis of the constellation graph.

Some examples of the method, transmitters, and non-transitory computer-readable medium described herein may further include operations, features, means, or instructions for sorting the first constellation point, the second constellation point, the third constellation point, and the fourth constellation point according to respective ascending magnitudes, sorting realizations of the first bit value, the second bit value, the third bit value, and the fourth bit value based on descending respective probabilities, and mapping one of the first bit value, the second bit value, the third bit value, and the fourth bit value having a relatively greatest probability of the respective probabilities to one of the first constellation point, the second constellation point, the third constellation point, and the fourth constellation point having a relatively smallest magnitude.

In some examples of the method, transmitters, and non-transitory computer-readable medium described herein, the first constellation point and the second constellation point may be defined on the constellation graph based on an amplitude.

A method for wireless communications by a receiver is described. The method may include receiving a message including a set of multiple systematic bits modulated according to an asymmetric modulation rule, demodulating the set of multiple systematic bits according to the asymmetric modulation rule, where a first bit value corresponds to a first constellation point on a constellation graph and a second bit value corresponds to a second constellation point on the constellation graph that is relatively closer to a center of the constellation graph than the first constellation point, and decoding the set of multiple systematic bits for the message, where the set of multiple systematic bits are nonuniformly distributed over a time period such that the first bit value has a first probability of occurrence during the time period and the second bit value has a second probability of occurrence during the time period that is greater than the first probability of the occurrence, where the second constellation point on the constellation graph is relatively closer to the center of the constellation graph than the first constellation point based on the second probability being greater than the first probability.

A receiver for wireless communications is described. The receiver may include one or more memories storing processor executable code, and one or more processors coupled with the one or more memories. The one or more processors may individually or collectively be operable to execute the code to cause the receiver to receive a message including a set of multiple systematic bits modulated according to an asymmetric modulation rule, demodulate the set of multiple systematic bits according to the asymmetric modulation rule, where a first bit value corresponds to a first constellation point on a constellation graph and a second bit value corresponds to a second constellation point on the constellation graph that is relatively closer to a center of the constellation graph than the first constellation point, and decode the set of multiple systematic bits for the message, where the set of multiple systematic bits are nonuniformly distributed over a time period such that the first bit value has a first probability of occurrence during the time period and the second bit value has a second probability of occurrence during the time period that is greater than the first probability of the occurrence, where the second constellation point on the constellation graph is relatively closer to the center of the constellation graph than the first constellation point based on the second probability being greater than the first probability.

Another receiver for wireless communications is described. The receiver may include means for receiving a message including a set of multiple systematic bits modulated according to an asymmetric modulation rule, means for demodulating the set of multiple systematic bits according to the asymmetric modulation rule, where a first bit value corresponds to a first constellation point on a constellation graph and a second bit value corresponds to a second constellation point on the constellation graph that is relatively closer to a center of the constellation graph than the first constellation point, and means for decoding the set of multiple systematic bits for the message, where the set of multiple systematic bits are nonuniformly distributed over a time period such that the first bit value has a first probability of occurrence during the time period and the second bit value has a second probability of occurrence during the time period that is greater than the first probability of the occurrence, where the second constellation point on the constellation graph is relatively closer to the center of the constellation graph than the first constellation point based on the second probability being greater than the first probability.

A non-transitory computer-readable medium storing code for wireless communications is described. The code may include instructions executable by one or more processors to receive a message including a set of multiple systematic bits modulated according to an asymmetric modulation rule, demodulate the set of multiple systematic bits according to the asymmetric modulation rule, where a first bit value corresponds to a first constellation point on a constellation graph and a second bit value corresponds to a second constellation point on the constellation graph that is relatively closer to a center of the constellation graph than the first constellation point, and decode the set of multiple systematic bits for the message, where the set of multiple systematic bits are nonuniformly distributed over a time period such that the first bit value has a first probability of occurrence during the time period and the second bit value has a second probability of occurrence during the time period that is greater than the first probability of the occurrence, where the second constellation point on the constellation graph is relatively closer to the center of the constellation graph than the first constellation point based on the second probability being greater than the first probability.

In some examples of the method, receivers, and non-transitory computer-readable medium described herein, the first bit value may be mapped to the first probability and the second bit value may be mapped to the second probability and the first bit value corresponds to a first constellation point and the second bit value corresponds to the second constellation point based on mappings.

Some examples of the method, receivers, and non-transitory computer-readable medium described herein may further include operations, features, means, or instructions for receiving an indication of a measure of the first probability of the first bit value and a measure of the second probability of the second bit value.

In some examples of the method, receivers, and non-transitory computer-readable medium described herein, receiving the indication may include operations, features, means, or instructions for receiving the indication of the measure of the first probability and the measure of the second probability via a quantity of bits less than the set of multiple systematic bits.

Some examples of the method, receivers, and non-transitory computer-readable medium described herein may further include operations, features, means, or instructions for receiving an indication of an estimated first probability of the first bit value and an estimated second probability of the second bit value.

In some examples of the method, receivers, and non-transitory computer-readable medium described herein, the set of multiple systematic bits nonuniformly distributed include one or more bits indicating an ACK and one or more bits indicating a NACK associated with a HARQ feedback process.

Some examples of the method, receivers, and non-transitory computer-readable medium described herein may further include operations, features, means, or instructions for receiving the message including a set of multiple parity bits modulated according to a symmetric modulation rule and demodulating the set of multiple parity bits according to the symmetric modulation rule such that a third bit value corresponds to a third constellation point on the constellation graph and a fourth bit value corresponds to a fourth constellation point on the constellation graph that may be equal distance to a center of the constellation graph as the third constellation point based on a fourth probability of the fourth bit value being equal to a third probability of the third bit value.

In some examples of the method, receivers, and non-transitory computer-readable medium described herein, the set of multiple systematic bits may be modulated onto a first axis of the constellation graph and the set of multiple parity bits may be modulated onto a second axis of the constellation graph.

In some examples of the method, receivers, and non-transitory computer-readable medium described herein, the first constellation point, the second constellation point, the third constellation point, and the fourth constellation point may be sorted according to respective ascending magnitudes, realizations of the first bit value, the second bit value, the third bit value, and the fourth bit value may be sorted based on descending respective probabilities, and one of the first bit value, the second bit value, the third bit value, and the fourth bit value having a relatively greatest probability of the respective probabilities may be mapped to one of the first constellation point, the second constellation point, the third constellation point, and the fourth constellation point having a relatively smallest magnitude.

In some examples of the method, receivers, and non-transitory computer-readable medium described herein, the first constellation point and the second constellation point may be defined on the constellation graph based on an amplitude.

DETAILED DESCRIPTION

Wireless communication systems may include the use of various modulation schemes for modulating transmissions. For example, quadrature phase-shift keying (QPSK), binary phase-shift keying (BPSK), quadrature amplitude modulation (QAM), pulse amplitude modulation (PAM), among other modulation schemes may be used to modulate an amplitude, phase, or other attribute of a waveform for an uplink or downlink signal to indicate different bits of information. In some examples, a quadrature (e.g., based on two waveforms that are 90 degrees out of phase and are added to generate a waveform) modulation scheme may be defined by a constellation of points in an IQ plot according to an In-Phase (I) axis and a Quadrature (Q) axis. In some cases, the modulation schemes may involve modulating a nonuniform source of bits, where the probabilities of a bit being either 1 or 0 are not the same (e.g., asymmetric). Modulation may further involve systematic codes, which includes a class of channel codes to encode data, such as the nonuniform source bits. In the systematic coding, additional bits (e.g., check bits) are introduced alongside the original message bits (e.g., the nonuniform source bits) to create a codeword. However, modulation using systematic codes may expect the source bits to be uniform and the modulation may otherwise result in performance loss at the transmitting device.

Aspects of the disclosure are initially described in the context of wireless communications systems. Aspects of the disclosure are further illustrated by and described with reference to apparatus diagrams, system diagrams, and flowcharts that relate to communicating nonuniform sources using systematic codes.

Figure 1:
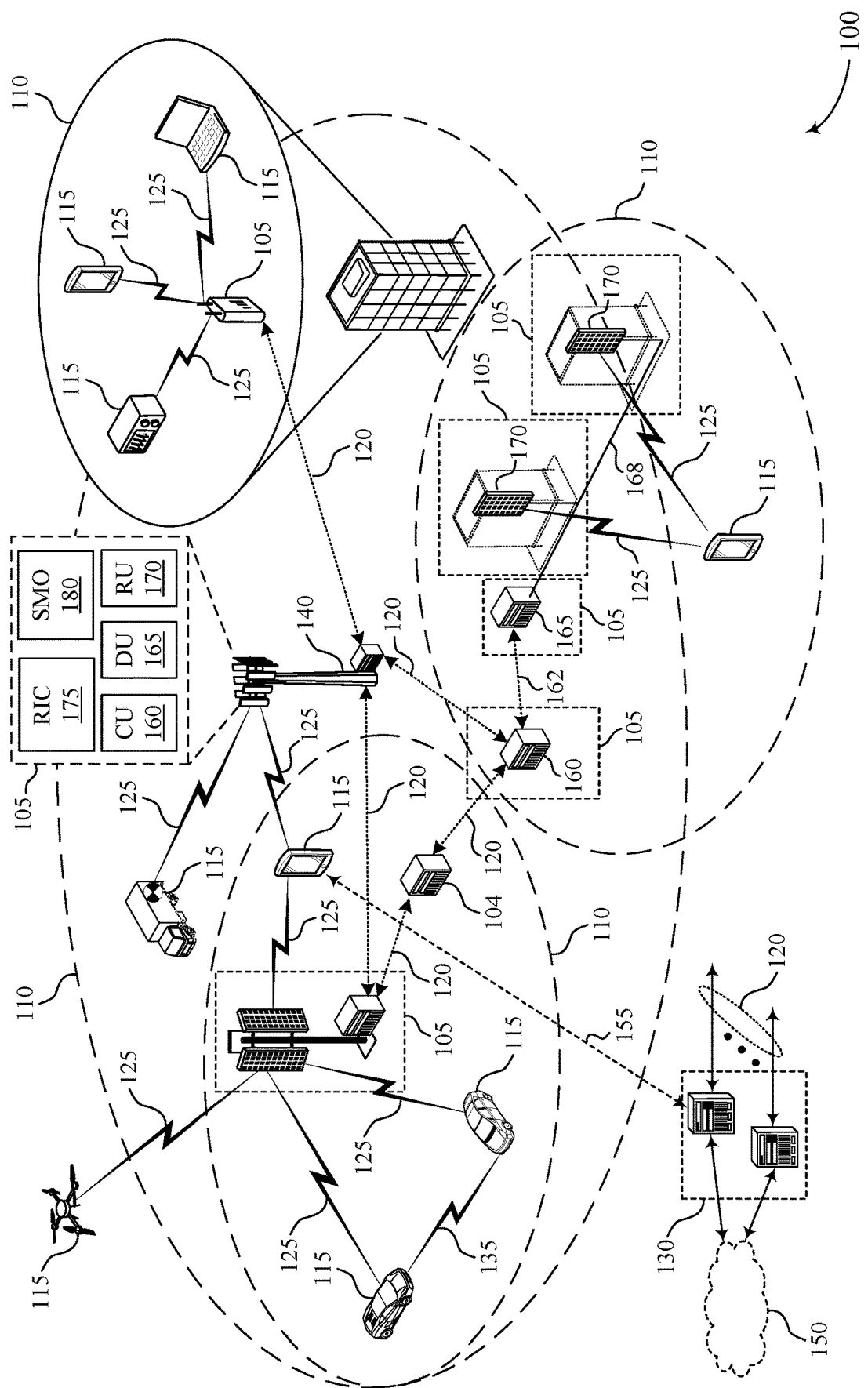
FIG. 1 shows an example of a wireless communications system that supports communicating nonuniform sources using systematic codes in accordance with one or more aspects of the present disclosure.

FIG. 1 shows an example of a wireless communications system 100 that supports communicating nonuniform sources using systematic codes in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of Ts=1/ ($\Delta f_{max} \cdot N_f$) seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system 100 may include the use of various modulation schemes for modulating transmissions. The modulation schemes may involve modulating a nonuniform source of bits, where the probabilities of a bit being either 1 or 0 are not the same (e.g., asymmetric). Modulation may further involve systematic codes, which includes a class of channel codes to encode data, such as the nonuniform source bits. In the systematic coding, additional bits (e.g., check bits) are introduced alongside the original message bits (e.g., the nonuniform source bits) to create a codeword. However, modulation using systematic codes may expect the source bits to be uniform and the modulation may otherwise result in performance loss at the transmitting device.

A transmitter, such as the UE 115 or the network entity 105, may use different modulation schemes for systematic bits and parity bits when modulating nonuniform source bits, such that the transmitter uses asymmetric modulation to modulate the nonuniformly distributed systematic bits while modulating uniformly distributed parity bits using symmetric modulation. For example, on a constellation graph for modulation, the nonuniform systematic bit associated with a greater probability may be mapped to a lower energy point and the nonuniform systematic bit associated with a lower probability may be mapped to a greater energy point, where the constellation points are asymmetric with respect to the center of the constellation graph (e.g., −1 and 0.3 rather than −1 and 1). In other words, the greater probability bit may be mapped to an inner constellation point and the lower probability bit may be mapped to an outer constellation point with respect to the center point (0,0) of the constellation graph, in an asymmetric manner. In some examples, the transmitter may measure the empirical distribution of the information payload (e.g., ratio of 0 bits and 1 bits in the payload of nonuniform source bits) and modulate using the asymmetric modulation according to the empirical distribution. The transmitter may transmit an indication of the empirical distribution to the receiver to be used for decoding. In some examples, the asymmetric modulation for modulating the nonuniform systematic bits may applied to higher order modulation and mapped, such as by mapping bits to constellation points on the I-axis and Q-axis of an IQ plot of the constellation graph.

Figure 2:
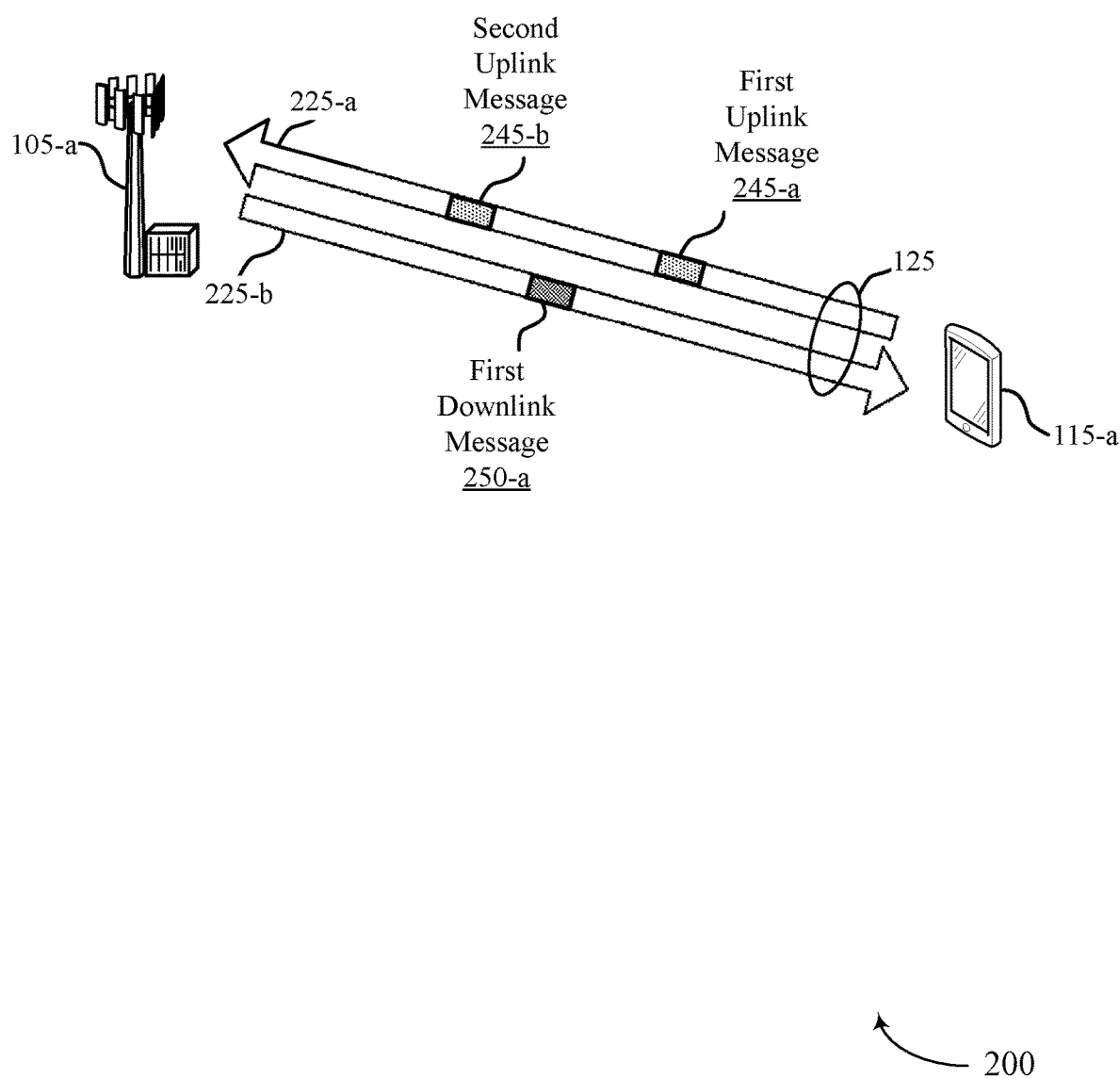
FIG. 2 shows an example of a wireless communications system that supports communicating nonuniform sources using systematic codes in accordance with one or more aspects of the present disclosure.

FIG. 2 shows an example of a wireless communications system 200 that supports communicating nonuniform sources using systematic codes in accordance with one or more aspects of the present disclosure. The wireless communications system 200 may implement aspects of or may be implemented by aspects of the wireless communications system 100. For example, the wireless communications system 200 includes a UE 115-a and a network entity 105-a, which may be examples of a UE 115 and a network entity 105 described with respect to FIG. 1.

In some examples of the wireless communications system 200, redundancies may occur in the information payload communicated at the PHY layer. For example, residual redundancy may occur after source coding. For some applications (e.g., involving communicating uplink control information and/or downlink control information), source coding may be difficult and in such applications, channel coding that may be applied to nonuniform source information may be beneficial. As an example, source information that is not uniformly distributed over a channel (e.g., additive white Gaussian noise (AWGN) channel), may result in errors with source coding. In particular, input distribution over the AWGN channel (e.g., assuming BPSK) may be uniformly distributed but the systematic bits may be nonuniformly distributed after modulation. As a result, capacity loss of the information may occur when using systematic codes to transmit nonuniform source. In some examples, using a nonsystematic coding may improve the performance (e.g., reduce capacity loss) but may be associated with tradeoffs (e.g., reduce decoding accuracy in varying source distribution). For example, if there is mismatch between expected source distribution at the transmitter and the actual source distribution, then the nonsystematic code may result in decoding issues at the transmitter. As discussed herein, systematic coding may be applied to nonuniform source bits (e.g., NR or 6G channel code), and the resulting modulation and transmitter performance may be similar to nonsystematic coding.

A nonuniform probability of messages (e.g., bits of the messages) may occur for several applications, such as HARQ, channel state information (CSI), and/or data communication. For HARQ applications, the UE 115-a may transmit an acknowledgement (ACK) and/or a negative acknowledgement (NACK) feedback message to the network entity 105-a, the ACK represented by bit 0 may be more likely than the NACK represented by bit 1. For example, the network entity 105-a may schedule 5 physical downlink shared channel (PDSCH) transmissions. The UE 115-a may transmit a 5-bit message for HARQ with ACK and/or NACK based on the decoding of PDSCH transmissions. In this example, 10% block error rate (BLER) in PDSCH may correspond to 10% NACK and 90% ACK probability. Accordingly, the probability of bit 0 representing ACK and bit 1 representing NACK, may be nonuniform. For CSI, and similar to HARQ-ACK, the distribution of channel state feedback (CSF) bits may be nonuniform. For data communication, semantic data communication for transmission of speech, image, and the like, may result with residual redundancy. In some examples, the techniques described herein may apply to conditional distribution of the source information that is nonuniformly distributed. In such examples, the raw distribution of the message bits may be uniform but the conditional distribution may be nonuniform based on prior knowledge or information received at the receiver, such that the probabilities of the message bits are nonuniformly distributed based on the additional information. In many applications, the receiver may already have such information about the source information, which may be utilized by the receiver when decoding.

In some examples, nonsystematic coding may provide modulation with relatively less performance loss than systematic coding, but the nonsystematic coding may be impacted by source entropy (e.g., nonuniform distribution of the message bits). In some examples, such as for BPSK and/or QPSK modulation, systematic coding may result in a bias over modulation symbols when the source distribution is not uniform over bit 1 and bit 0, {0,1}. In such examples, the mean or average of the transmitted signal is not zero, indicating performance loss or inefficacies (e.g., wasted energy in modulation transmission). As discussed herein, the transmitter (e.g., the UE 115-a) may use an asymmetric modulation on the systematic bits when modulating the source bits. The systematic bits, s, may be distributed with probability, Pr, such that Pr (s=0)=p (e.g., p represents the probability of the systematic bit s being 0). The systematic bits may be modulated based on the following asymmetric modulation rule:

$$\{0, 1\} \rightarrow \left\{ \sqrt{\frac{1-p}{p}}, -\sqrt{\frac{p}{1-p}} \right\}$$

The resulting constellation scheme may have a zero mean and unit variance (e.g., when the systematic bits are distributed according to Pr (s=0)=p). The parity bits and/or cyclic redundancy check (CRC) bits for modulating may be uniformly distributed or approximately uniformly distributed, and thus, may be modulating using symmetric modulation schemes (e.g., BPSK and/or QPSK). Accordingly, different modulation may be used for systematic bits, parity bits, and/or CRC bits. The I axis and Q axis may be separately modulated depending on the content being mapped. For example, a systematic bit priority mapping (SBPM) may be enabled for the modulated transmission and a QPSK modulation may include one systematic bit and one parity bit on the I-axis and the Q-axis, respectively. In this example, the asymmetric modulation may be applied to the I-axis and symmetric modulation (e.g., BPSK) may be applied to the Q-axis. BPSK on Q.

In some examples, the probability of systematic bit 0 may be 90% (or 0.9) and the probability of systematic bit 1 may be 10% (or 0.1). The systematic bit 0 with the higher probability may be mapped to a lower energy point (e.g., lower amplitude) on the constellation map than the systematic bit 1 with the lower probability. That is, accordingly to the techniques described herein, a first set of first bits may be modulated according to a first probability (e.g., systematic bit 0 to 90%) onto a first modulation point (e.g., the systematic bit 0 mapped to −3 on an x-axis) and a second set of second bits may be modulated according to a second probability (e.g., systematic bit 1 to 10%) onto a second modulation point (e.g., the systematic bit 1 mapped to ⅓ on the x-axis) based on the asymmetric modulation rule discussed herein (e.g., $$\{0, 1\} \rightarrow \left\{ \sqrt{\frac{1-p}{p}}, -\sqrt{\frac{p}{1-p}} \right\}.$$

The resulting mapping may be asymmetric along the x-axis with respect to the center (0,0). In some examples, the techniques discussed herein may increase the performance of systematic coding, for example, by 2 decibels (dB) and may be used with source model variation without or reduced performance loss.

In some examples, the transmitter (e.g., the UE 115-a) may indicate the source distribution to the receiver (e.g., the network entity 105-a). The transmitter may measure the empirical distribution of the information payload (e.g., count the quantity of 0 bits and 1 bits and/or determine ratio of 0's and 1's in the payload), and modulate using the asymmetric modulation on systematic bits according to the empirical distribution. The transmitter may transmit signaling (e.g., control signaling) indicating the empirical distribution to the receiver. The signaling indicating the empirical distribution may indicate the distribution parameter using less bits than the systematic bits, for example, based on a fixed-point decoder of the receiver (e.g., three to four bits while systematic bits are of greater quantity). For a data channel communication, the indication of the empirical distribution may be provided as a code block (CB) or a transport block (TB). In some examples, the network entity 105-a may transmit signaling over DCI to the UE 115-a, for example, indicating an uplink grant. The UE 115-a may subsequently transmit signaling (e.g., piggy backing) over the PUSCH, using the techniques described herein.

In some examples, the techniques described herein, such as the asymmetric modulation on systematic bits, may apply to higher order QAM (e.g., using the four quadrature of the IQ plot in the constellation mapping). The constellation points may be sorted according to their magnitude (from low to high), the realizations of the bit groups may be sorted according to their probability (from large to small), and the bit realization with larger probability may be mapped to the constellation with smaller magnitude. This sorting and mapping procedure may be applied at the transmitter and/or the receiver. Accordingly, the transmitter and the receiver may both benefit from being aware of modulation-related information, such as the receiver being aware of the empirical distribution of systematic bits indicated by the transmitter.

For higher order modulation (e.g., QAM), the bit to constellation mapping rule may be adjusted, such that a set of bits with higher probability may be mapped to an inner part of the constellation, and the set of bits with lower probability may be mapped to the outer constellation. As an example, for 16 QAM, two bits may be mapped to the I-axis and two bits may be mapped to Q-axis. In this example, the set of bits of bit 0 may have a greater probability than the set of bits of bit 1. Accordingly, for the I-axis, four constellation points $\{-3, -1, 1, 3\}$ may be used, where $-1$ and $1$ denotes inner constellation, $-3$ and $3$ denotes outer constellation. The inner and outer constellation points may be defined based on the amplitude or energy of each of the constellation points. The systematic bit and a parity bit (s, p) may be grouped into one constellation, such that p maps to the sign (e.g., + or −) and s maps to the magnitude of the modulation (e.g., 1 or 3). The groups of s=0, p=0 may map to 1, the group of s=0, p=1 may map to −1, the group of s=1, p=0 may map to 3, and the group of s=1, p=1 may map to −3.

The techniques discussed herein may apply to arbitrary systematic channel codes, such as low-density parity check (LDPC) codes, turbo codes, convolutional codes, and/or systematic polar codes or systematic Reed Muller code. In some examples, the techniques discussed herein may apply to modulations where only a portion of the systematic bits are transmitted. For example, a portion of systematic bits may be transmitted due to a puncturing operation that occurs with the coding scheme (e.g., 5G NR LDPC codes). A portion of systematic bits may be transmitted also due to different redundancy versions of the channel codes, where some redundancy versions may include a portion of the systematic bits.

In the wireless communications system 200, to apply the modulation techniques discussed herein, the network entity 105-a may communicate with the UE 115-a using a communication link 125. In some examples, the communication link 125 may include a first channel 225-a for transmitting data from the UE 115-a to the network entity 105-a and a second channel 225-b for transmitting data from the network entity 105-a to the UE 115-a. The communication link 125 may be an example of an NR or LTE link between the UE 115-a and the network entity 105-a. The communication link 125 may include a bi-directional link that enables both uplink and downlink communications, for example, via the channels 225. For example, the UE 115-a may transmit uplink messages 245 (e.g., uplink transmissions), such as uplink control signals or uplink data signals, to the network entity 105-a using the first channel 225-a (e.g., of the communication link 125) and the network entity 105-a may transmit downlink messages 250 (e.g., downlink transmissions), such as downlink control signals or downlink data signals, to the UE 115-a using the second channel 225-b (e.g., of the communication link 125). In some examples, the downlink messages 250 may be part of control signaling transmitted from the network entity 105-a.

The network entity 105-a may transmit first source bits in a first downlink message 250-a, which may be nonuniformly distributed. The UE 115-a may modulate the source bits as discussed herein, for example, using asymmetric modulation on systematic bits used in modulating the source bits. The UE 115-a may transmit, in a first uplink message 245-a, an indication of the empirical distribution of the systematic bits. For example, the indication may include an estimated first probability of first bits (e.g., probability of 0's) and an estimated second probability of second bits (e.g., probability of 1's). The network entity 105-a, as the receiver, may use the indication of the probabilities when decoding the modulated message from the UE 115-a. Accordingly, the UE 115-a may also transmit, in a second uplink message 245-b, the message including the systematic bits modulated accordingly to the asymmetric modulation rule.

Figure 3:
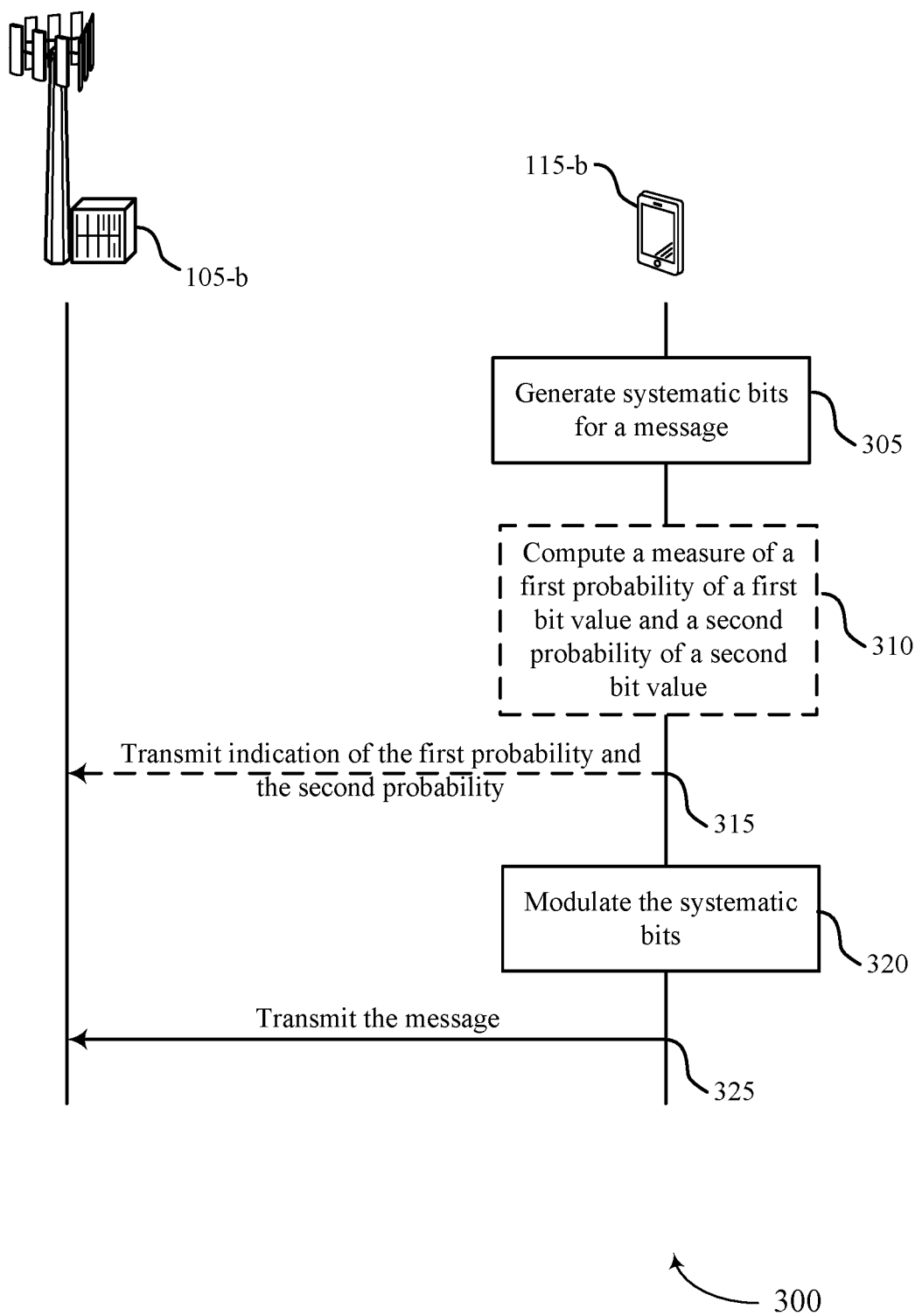
FIG. 3 shows an example of a process flow that supports communicating nonuniform sources using systematic codes in accordance with one or more aspects of the present disclosure.

FIG. 3 shows an example of a process flow 300 that supports communicating nonuniform sources using systematic codes in accordance with one or more aspects of the present disclosure. The process flow 300 may implement aspects of or may be implemented by aspects of the wireless communications system 100 or the wireless communications system 200. For example, the process flow 300 may include a UE 115-b and a network entity 105-b, which may be an example of a UE 115 and a network entity 105 as described herein. In the following description of the process flow 300, the operations performed by the UE 115-b and the network entity 105-b may be performed in different orders or at different times than the exemplary order shown. Some operations may also be omitted from the process flow 300, or other operations may be added to the process flow 300. Further, while operations in the process flow 300 are illustrated as being performed by the UE 115-b and the network entity 105-b, the examples herein are not to be construed as limiting, as the described features may be associated with any quantity of different devices. Although the following discussions describe the UE 115-b as operating as a transmitter that modulates and transmits the modulated message, the techniques described herein may apply to the network entity 105-b operating as the transmitter and the UE 115-b operating as the receiver. For example, the techniques described herein may apply to uplink communications between the UE 115-b and the network entity 105-b, downlink communications between the network entity 105-b and the UE 115-b, sidelink communications between UEs 115 (e.g., UE 115 to UE 115), or backhaul communications between network entities 105 (e.g., network entity 105 to network entity 105).

At 305, the UE 115-b may generate multiple systematic bits for a message, where the multiple systematic bits are nonuniformly distributed over a time period such that the first bit value has the first probability of occurrence during the time period and the second bit value has the second probability of occurrence during the time period that is greater than the first probability of the occurrence. In some examples, the multiple systematic bits nonuniformly distributed include one or more bits indicating an ACK and one or more bits indicating a NACK associated with a HARQ feedback process.

In some examples, at 310, the UE 115-b may compute a measure of a first probability of a first bit value and a measure of a second probability of a second bit value. In some examples, at 315, the UE 115-b may transmit an indication of the measure of the first probability and the measure of the second probability. In some examples, the UE 115-b may transmit the indication of the measure of the first probability and the measure of the second probability using a quantity of bits less than the multiple systematic bits.

In some examples, the UE 115-a may estimate the first probability of the first bit value and the second probability of the second bit value (e.g., rather than compute) and transmit an indication of the estimated first probability and the estimated second probability to the network entity 105-*b* (e.g., the receiver). In some examples, the UE 115-*a* may map the first bit value to the first probability and map the second bit value to the second probability. The first bit value may correspond to the first constellation point and the second bit value may correspond to the second constellation point based on mappings.

At 320, the UE 115-*b* may modulate the multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability.

At 325, the UE 115-*b* may transmit the message including the multiple systematic bits modulated according to the asymmetric modulation rule. In some examples, the UE 115-*b* may modulate the multiple parity bits according to a symmetric modulation rule such that a third bit value has a third probability of occurrence during the time period and a fourth bit value has a fourth probability of occurrence during the time period that is equal to the third probability of the occurrence, where the third bit value corresponds to a third constellation point on the constellation graph and the fourth bit value corresponds to a fourth constellation point on the constellation graph that is equal distance to a center of the constellation graph as the third constellation point based on the fourth probability being equal to the third probability. The UE 115-*b* may transmit the message including the multiple parity bits modulated according to the symmetric modulation rule. The multiple systematic bits may be modulated onto a first axis of the constellation graph and the multiple parity bits may be modulated onto a second axis of the constellation graph.

In some examples, the first constellation point, the second constellation point, and one or more additional constellation points are sorted according to respective ascending magnitudes, realizations of the first bit value, the second bit value, and one or more additional bit values corresponding to one or more additional constellation points are sorted based at least in part on descending respective probabilities, and one of the first bit value, the second bit value, and the one or more additional bit values having a relatively greatest probability of the respective probabilities is mapped to one of the first constellation point, the second constellation point, and the one or more additional constellation points having a relatively smallest magnitude. The first constellation point and the second constellation point may be defined on the constellation graph based at least in part on an amplitude.

Figure 4:
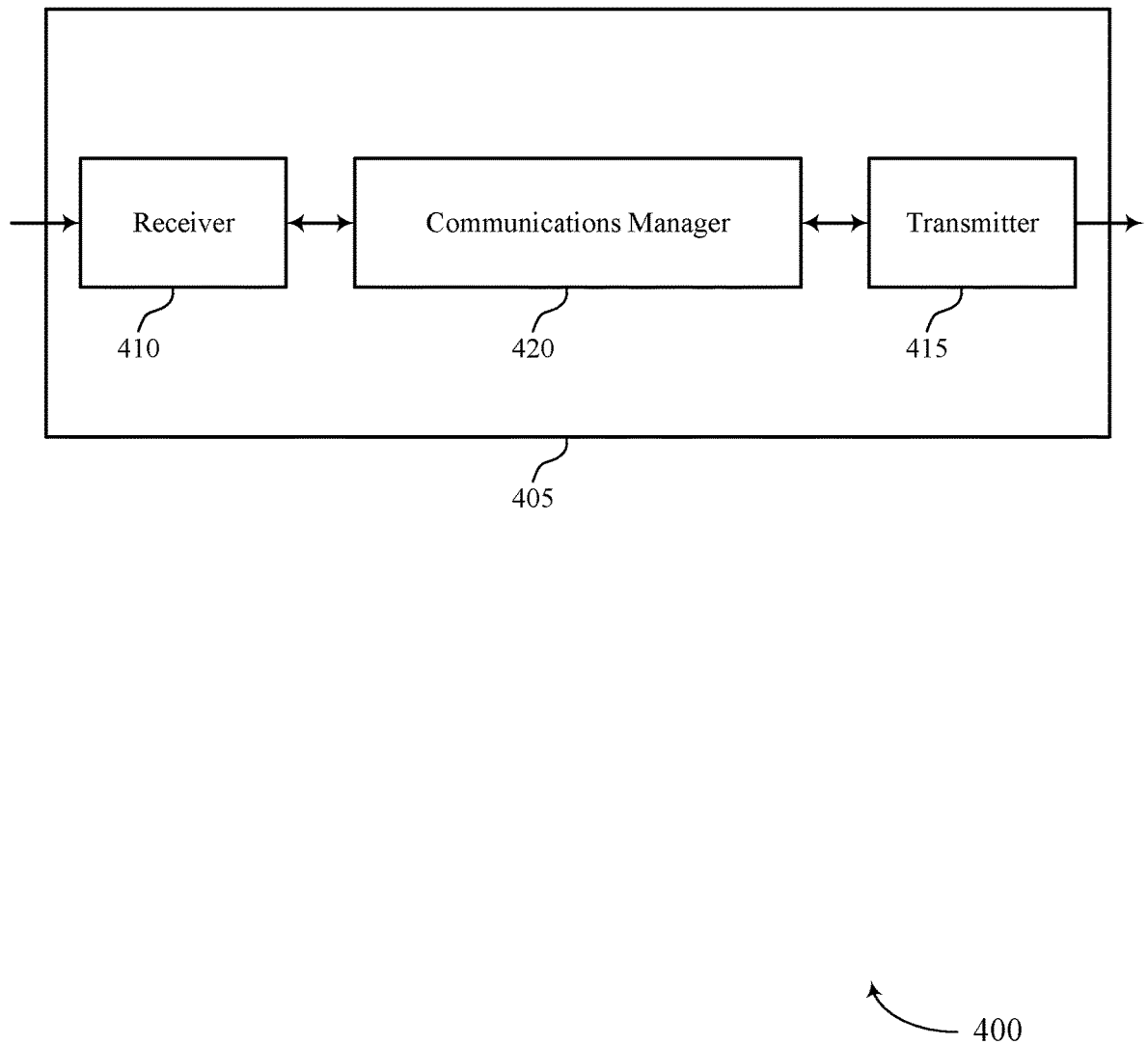
FIGS. 4 and 5 show block diagrams of devices that support communicating nonuniform sources using systematic codes in accordance with one or more aspects of the present disclosure.

FIG. 4 shows a block diagram 400 of a device 405 that supports communicating nonuniform sources using systematic codes in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to communicating nonuniform sources using systematic codes). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to communicating nonuniform sources using systematic codes). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of communicating nonuniform sources using systematic codes as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for generating a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence. The communications manager 420 is capable of, configured to, or operable to support a means for modulating the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability. The communications manager 420 is capable of, configured to, or operable to support a means for transmitting the message including the set of multiple systematic bits modulated according to the asymmetric modulation rule.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for efficiently modulating nonuniform source bits with systematic code.

Figure 5:
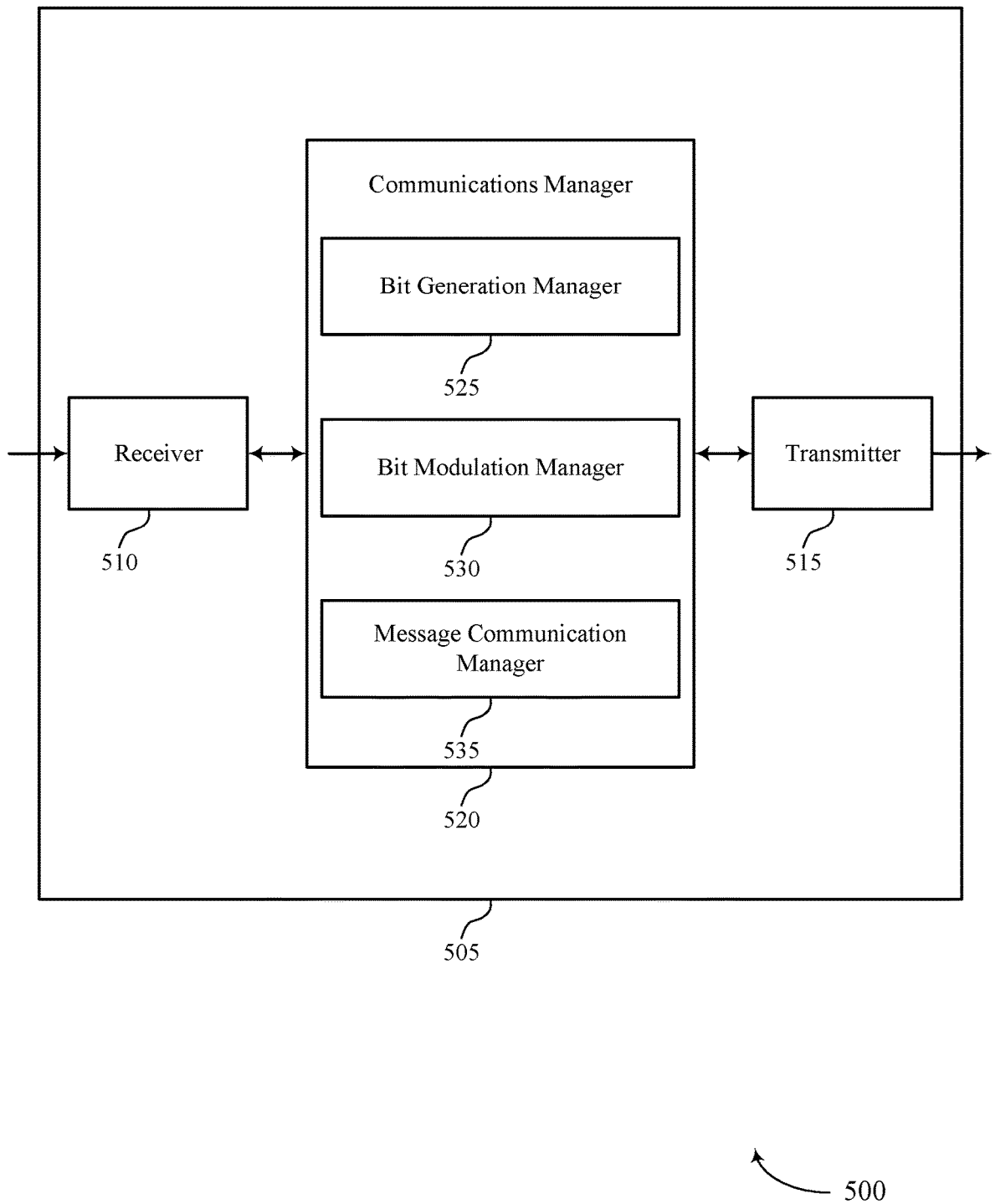

FIG. 5 shows a block diagram 500 of a device 505 that supports communicating nonuniform sources using systematic codes in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to communicating nonuniform sources using systematic codes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to communicating nonuniform sources using systematic codes). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of communicating nonuniform sources using systematic codes as described herein. For example, the communications manager 520 may include a bit generation manager 525, a bit modulation manager 530, a message communication manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The bit generation manager 525 is capable of, configured to, or operable to support a means for generating a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence. The bit modulation manager 530 is capable of, configured to, or operable to support a means for modulating the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability. The message communication manager 535 is capable of, configured to, or operable to support a means for transmitting the message including the set of multiple systematic bits modulated according to the asymmetric modulation rule.

Figure 6:
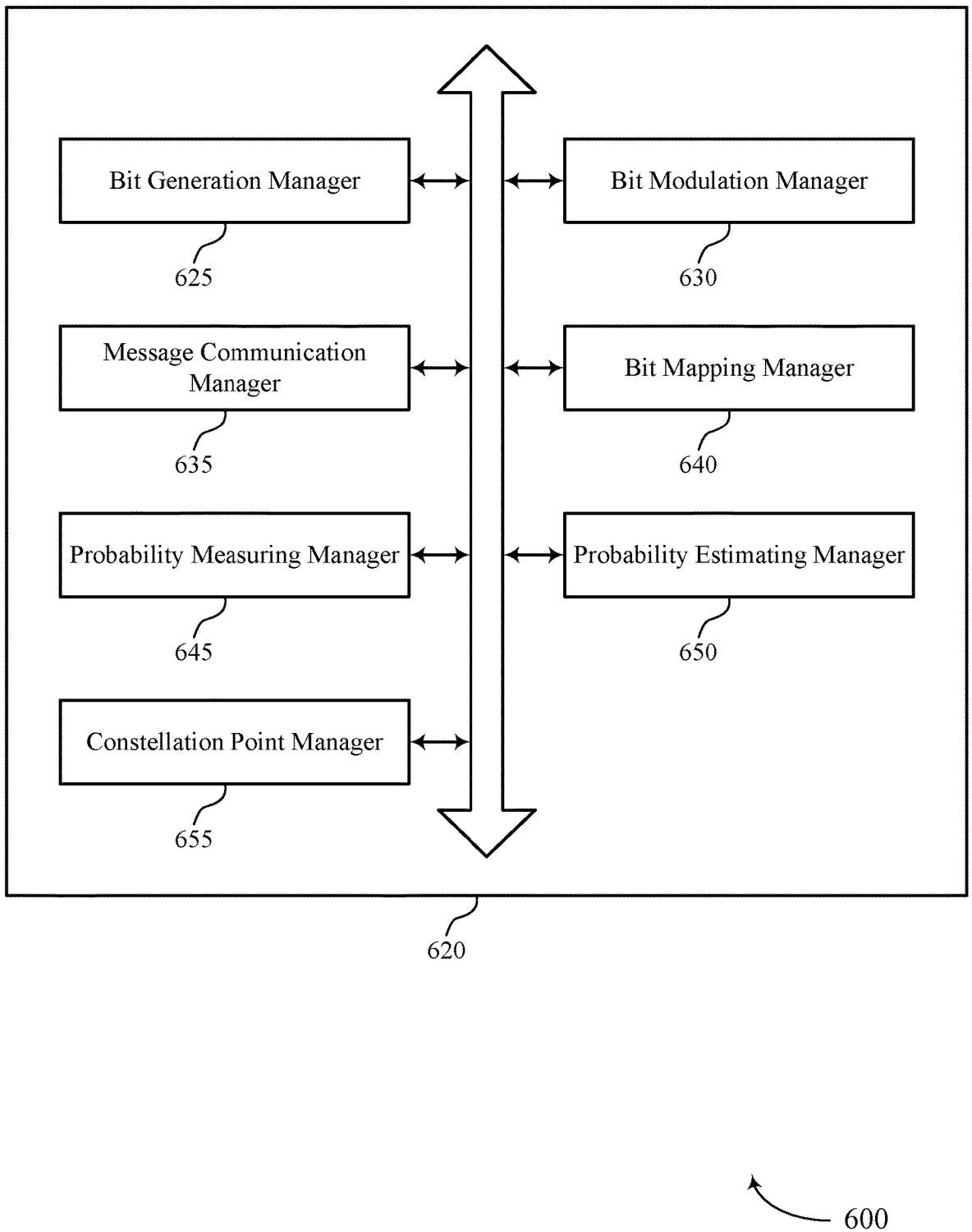
FIG. 6 shows a block diagram of a communications manager that supports communicating nonuniform sources using systematic codes in accordance with one or more aspects of the present disclosure.

FIG. 6 shows a block diagram 600 of a communications manager 620 that supports communicating nonuniform sources using systematic codes in accordance with one or more aspects of the present disclosure. The communications manager 620 may be an example of aspects of a communications manager 420, a communications manager 520, or both, as described herein. The communications manager 620, or various components thereof, may be an example of means for performing various aspects of communicating nonuniform sources using systematic codes as described herein. For example, the communications manager 620 may include a bit generation manager 625, a bit modulation manager 630, a message communication manager 635, a bit mapping manager 640, a probability measuring manager 645, a probability estimating manager 650, a constellation point manager 655, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The bit generation manager 625 is capable of, configured to, or operable to support a means for generating a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence. The bit modulation manager 630 is capable of, configured to, or operable to support a means for modulating the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability. The message communication manager 635 is capable of, configured to, or operable to support a means for transmitting the message including the set of multiple systematic bits modulated according to the asymmetric modulation rule.

In some examples, the first bit value having the first probability is mapped to the first constellation point according to a first expression comprising a square root of a difference between one and the first probability divided by the first probability, and the second bit value having the second probability is mapped to the second constellation point according to a second expression comprising a negative of the square root of the first probability divided by the difference between one and the first probability.

In some examples, the probability measuring manager 645 is capable of, configured to, or operable to support a means for computing a measure of the first probability of the first bit value and a measure of the second probability of the second bit value. In some examples, the message communication manager 635 is capable of, configured to, or operable to support a means for transmitting an indication of the measure of the first probability and the measure of the second probability.

In some examples, to support transmitting the indication, the message communication manager 635 is capable of, configured to, or operable to support a means for transmitting the indication of the measure of the first probability and the measure of the second probability using a quantity of bits less than the set of multiple systematic bits.

In some examples, the probability estimating manager 650 is capable of, configured to, or operable to support a means for estimating the first probability of the first bit value and the second probability of the second bit value. In some examples, the message communication manager 635 is capable of, configured to, or operable to support a means for transmitting an indication of the estimated first probability and the estimated second probability.

In some examples, the set of multiple systematic bits nonuniformly distributed include one or more bits indicating an ACK and one or more bits indicating a NACK associated with a HARQ feedback process.

In some examples, the bit generation manager 625 or the bit modulation manager 630 is capable of, configured to, or operable to support a means for modulating the set of multiple parity bits according to a symmetric modulation rule such that a third bit value has a third probability of occurrence during the time period and a fourth bit value has a fourth probability of occurrence during the time period that is equal to the third probability of the occurrence, where the third bit value corresponds to a third constellation point on the constellation graph and the fourth bit value corresponds to a fourth constellation point on the constellation graph that is equal distance to a center of the constellation graph as the third constellation point based on the fourth probability being equal to the third probability. In some examples, the message communication manager 635 is capable of, configured to, or operable to support a means for transmitting the message including the set of multiple parity bits modulated according to the symmetric modulation rule.

In some examples, the set of multiple systematic bits are modulated onto a first axis of the constellation graph and the set of multiple parity bits are modulated onto a second axis of the constellation graph.

In some examples, the constellation point manager 655 is capable of, configured to, or operable to support a means for sorting the first constellation point, the second constellation point, and one or more additional constellation points according to respective ascending magnitudes. In some examples, the constellation point manager 655 is capable of, configured to, or operable to support a means for sorting realizations of the first bit value, the second bit value, and one or more additional bit values corresponding to the one or more additional constellation points based at least in part on descending respective probabilities. In some examples, the bit mapping manager 640 is capable of, configured to, or operable to support a means for mapping one of the first bit value, the second bit value, and the one or more additional bit values having a relatively greatest probability of the respective probabilities to one of the first constellation point, the second constellation point, and the one or more additional constellation points have a relatively smallest magnitude.

In some examples, the first constellation point and the second constellation point are defined on the constellation graph based on an amplitude.

Figure 7:
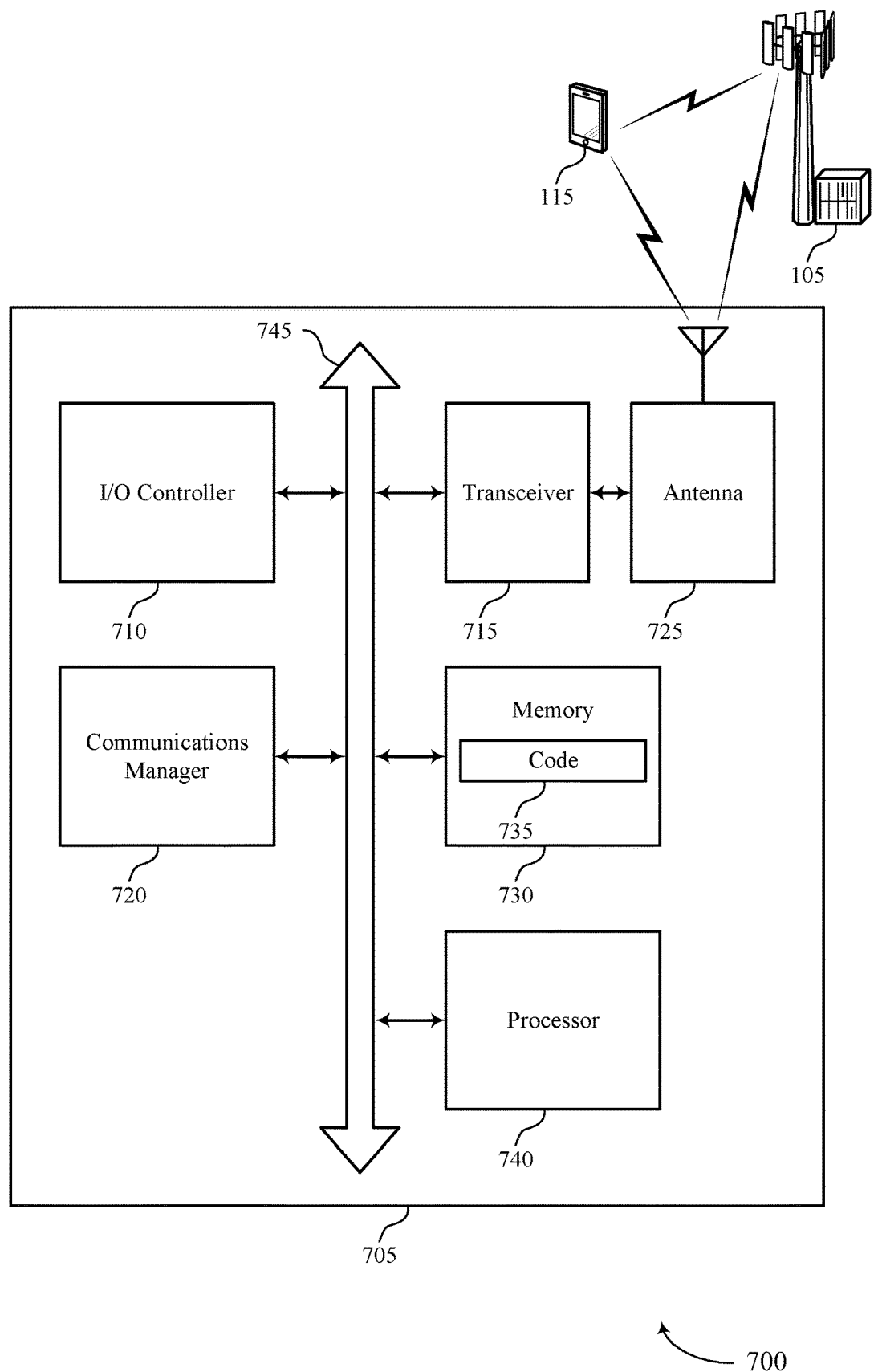
FIG. 7 shows a diagram of a system including a device that supports communicating nonuniform sources using systematic codes in accordance with one or more aspects of the present disclosure.

FIG. 7 shows a diagram of a system 700 including a device 705 that supports communicating nonuniform sources using systematic codes in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting communicating nonuniform sources using systematic codes). For example, the device 705 or a component of the device 705 may include at least one processor 740 and at least one memory 730 coupled with or to the at least one processor 740, the at least one processor 740 and the at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for generating a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence. The communications manager 720 is capable of, configured to, or operable to support a means for modulating the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability. The communications manager 720 is capable of, configured to, or operable to support a means for transmitting the message including the set of multiple systematic bits modulated according to the asymmetric modulation rule.

By including or configuring the communications manager 720 in accordance with examples as described herein, the device 705 may support techniques for efficiently modulating nonuniform source bits with systematic code.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of communicating nonuniform sources using systematic codes as described herein, or the at least one processor 740 and the at least one memory 730 may be otherwise configured to, individually or collectively, perform or support such operations.

Figure 8:
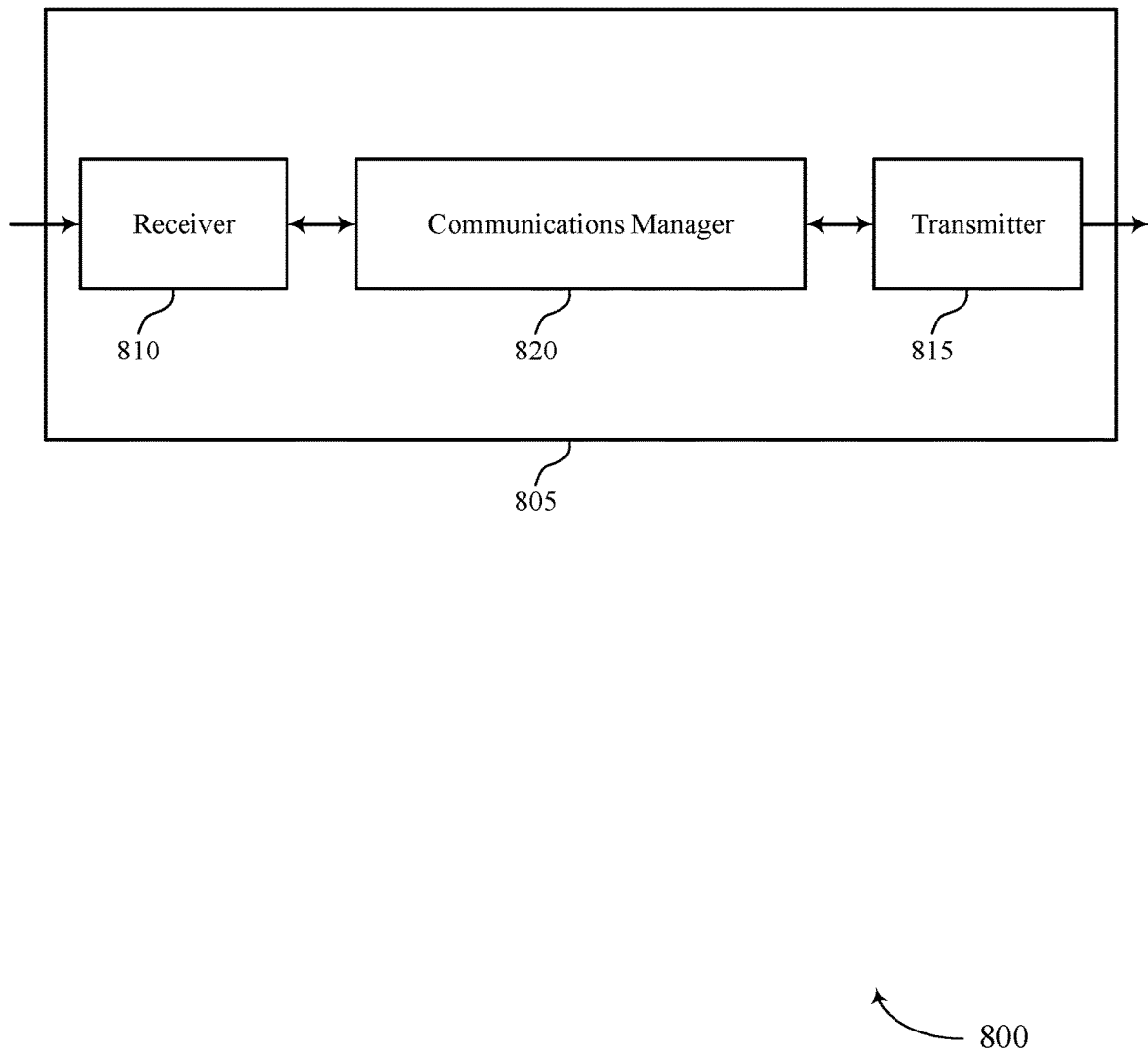
FIGS. 8 and 9 show block diagrams of devices that support communicating nonuniform sources using systematic codes in accordance with one or more aspects of the present disclosure.

FIG. 8 shows a block diagram 800 of a device 805 that supports communicating nonuniform sources using systematic codes in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations or components thereof may be examples of means for performing various aspects of communicating nonuniform sources using systematic codes as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving a message including a set of multiple systematic bits modulated according to an asymmetric modulation rule. The communications manager 820 is capable of, configured to, or operable to support a means for demodulating the set of multiple systematic bits according to the asymmetric modulation rule, where a first bit value corresponds to a first constellation point on a constellation graph and a second bit value corresponds to a second constellation point on the constellation graph that is relatively closer to a center of the constellation graph than the first constellation point. The communications manager 820 is capable of, configured to, or operable to support a means for decoding the set of multiple systematic bits for the message, where the set of multiple systematic bits are nonuniformly distributed over a time period such that the first bit value has a first probability of occurrence during the time period and the second bit value has a second probability of occurrence during the time period that is greater than the first probability of the occurrence, where the second constellation point on the constellation graph is relatively closer to the center of the constellation graph than the first constellation point based on the second probability being greater than the first probability.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for efficiently modulating nonuniform source bits with systematic code.

Figure 9:
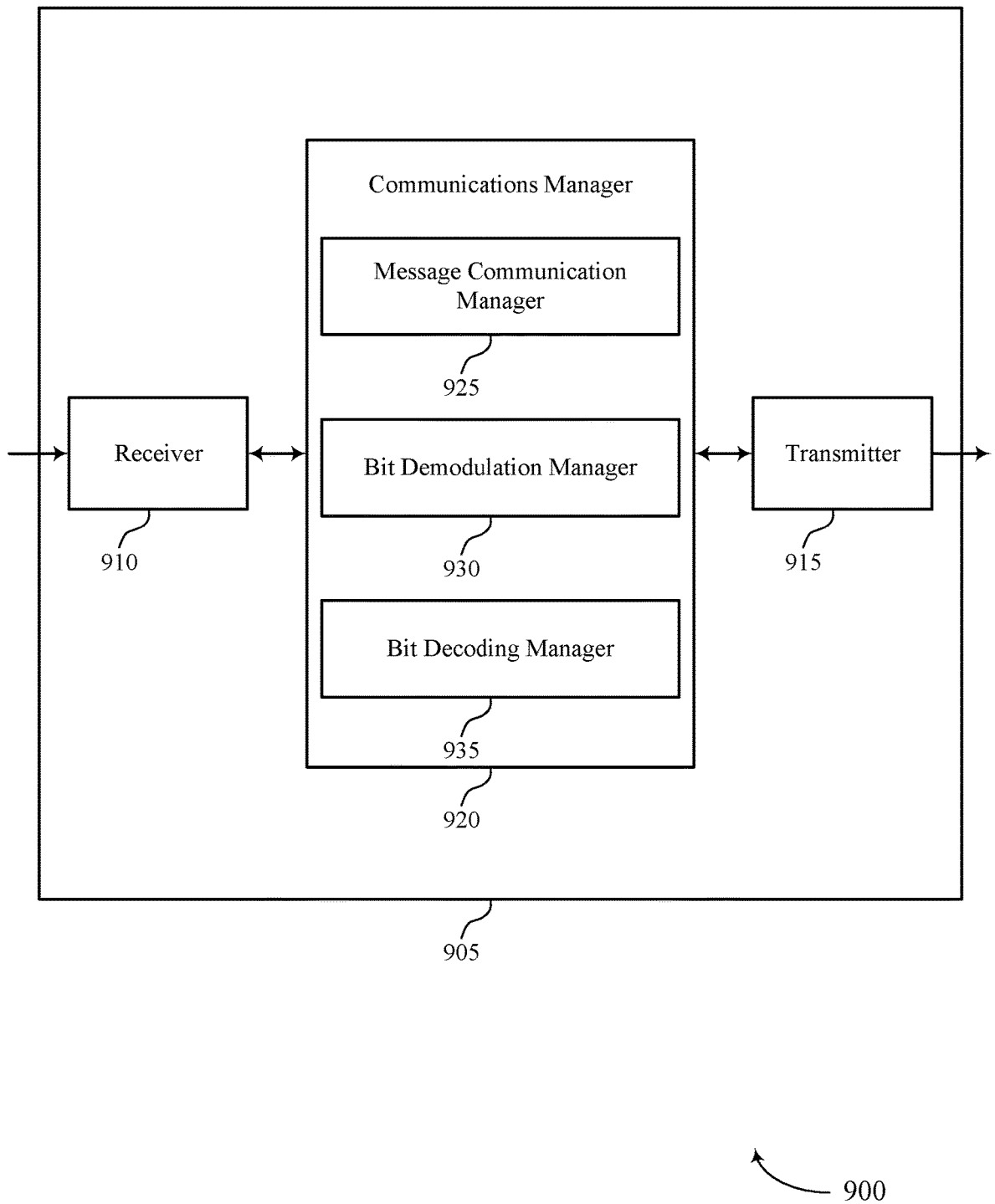

FIG. 9 shows a block diagram 900 of a device 905 that supports communicating nonuniform sources using systematic codes in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of communicating nonuniform sources using systematic codes as described herein. For example, the communications manager 920 may include a message communication manager 925, a bit demodulation manager 930, a bit decoding manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The message communication manager 925 is capable of, configured to, or operable to support a means for receiving a message including a set of multiple systematic bits modulated according to an asymmetric modulation rule. The bit demodulation manager 930 is capable of, configured to, or operable to support a means for demodulating the set of multiple systematic bits according to the asymmetric modulation rule, where a first bit value corresponds to a first constellation point on a constellation graph and a second bit value corresponds to a second constellation point on the constellation graph that is relatively closer to a center of the constellation graph than the first constellation point. The bit decoding manager 935 is capable of, configured to, or operable to support a means for decoding the set of multiple systematic bits for the message, where the set of multiple systematic bits are nonuniformly distributed over a time period such that the first bit value has a first probability of occurrence during the time period and the second bit value has a second probability of occurrence during the time period that is greater than the first probability of the occurrence, where the second constellation point on the constellation graph is relatively closer to the center of the constellation graph than the first constellation point based on the second probability being greater than the first probability.

Figure 10:
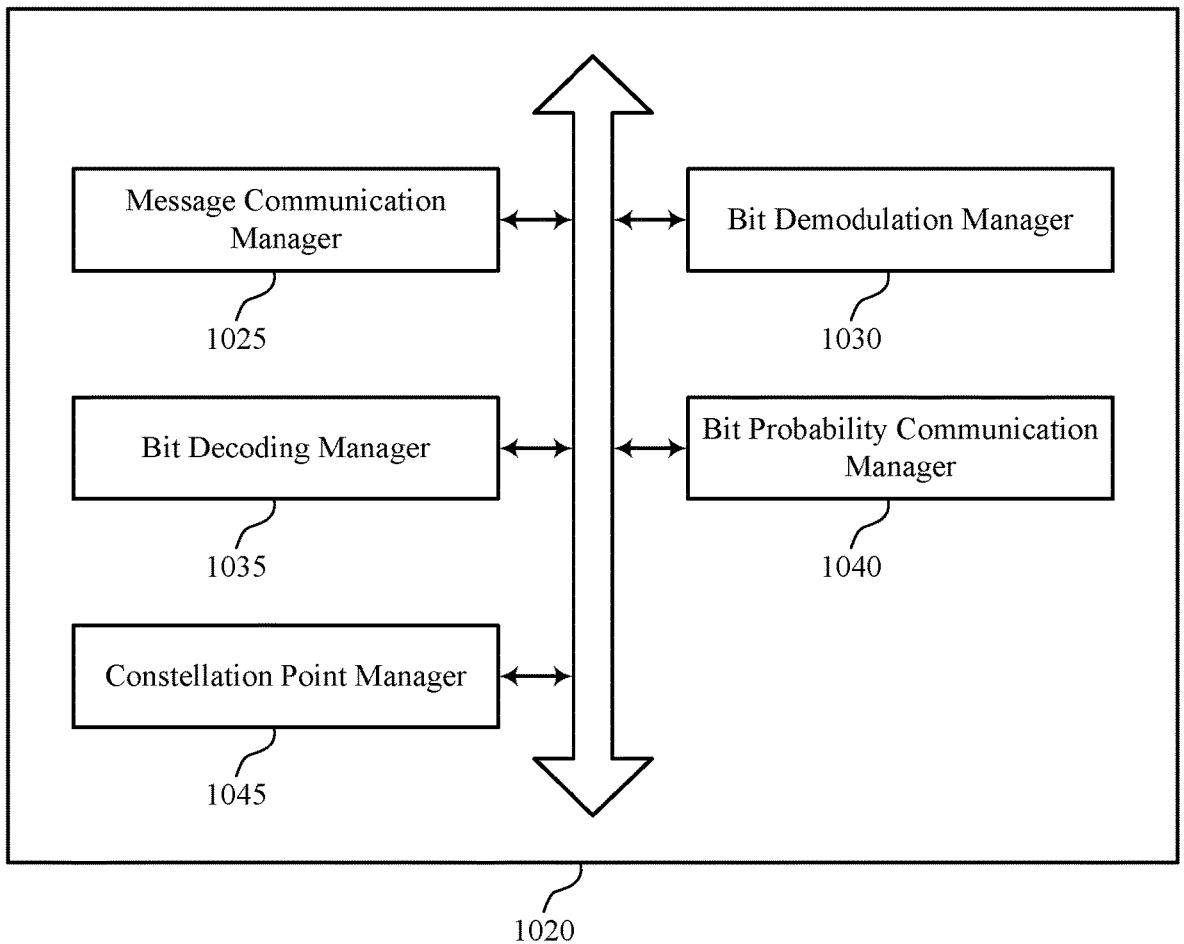
FIG. 10 shows a block diagram of a communications manager that supports communicating nonuniform sources using systematic codes in accordance with one or more aspects of the present disclosure.

FIG. 10 shows a block diagram 1000 of a communications manager 1020 that supports communicating nonuniform sources using systematic codes in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of communicating nonuniform sources using systematic codes as described herein. For example, the communications manager 1020 may include a message communication manager 1025, a bit demodulation manager 1030, a bit decoding manager 1035, a bit probability communication manager 1040, a constellation point manager 1045, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The message communication manager 1025 is capable of, configured to, or operable to support a means for receiving a message including a set of multiple systematic bits modulated according to an asymmetric modulation rule. The bit demodulation manager 1030 is capable of, configured to, or operable to support a means for demodulating the set of multiple systematic bits according to the asymmetric modulation rule, where a first bit value corresponds to a first constellation point on a constellation graph and a second bit value corresponds to a second constellation point on the constellation graph that is relatively closer to a center of the constellation graph than the first constellation point. The bit decoding manager 1035 is capable of, configured to, or operable to support a means for decoding the set of multiple systematic bits for the message, where the set of multiple systematic bits are nonuniformly distributed over a time period such that the first bit value has a first probability of occurrence during the time period and the second bit value has a second probability of occurrence during the time period that is greater than the first probability of the occurrence, where the second constellation point on the constellation graph is relatively closer to the center of the constellation graph than the first constellation point based on the second probability being greater than the first probability.

In some examples, the first bit value is mapped to the first probability and the second bit value is mapped to the second probability. In some examples, the first bit value corresponds to a first constellation point and the second bit value corresponds to the second constellation point based on mappings.

In some examples, the bit probability communication manager 1040 is capable of, configured to, or operable to support a means for receiving an indication of a measure of the first probability of the first bit value and a measure of the second probability of the second bit value.

In some examples, to support receiving the indication, the bit probability communication manager 1040 is capable of, configured to, or operable to support a means for receiving the indication of the measure of the first probability and the measure of the second probability via a quantity of bits less than the set of multiple systematic bits.

In some examples, the bit probability communication manager 1040 is capable of, configured to, or operable to support a means for receiving an indication of an estimated first probability of the first bit value and an estimated second probability of the second bit value.

In some examples, the set of multiple systematic bits nonuniformly distributed include one or more bits indicating an ACK and one or more bits indicating a NACK associated with a HARQ feedback process.

In some examples, the message communication manager 1025 is capable of, configured to, or operable to support a means for receiving the message including a set of multiple parity bits modulated according to a symmetric modulation rule. In some examples, the bit demodulation manager 1030 is capable of, configured to, or operable to support a means for demodulating the set of multiple parity bits according to the symmetric modulation rule such that a third bit value corresponds to a third constellation point on the constellation graph and a fourth bit value corresponds to a fourth constellation point on the constellation graph that is equal distance to a center of the constellation graph as the third constellation point based on a fourth probability of the fourth bit value being equal to a third probability of the third bit value.

In some examples, the set of multiple systematic bits are modulated onto a first axis of the constellation graph and the set of multiple parity bits are modulated onto a second axis of the constellation graph.

In some examples, the first constellation point, the second constellation point, and one or more additional constellation points are sorted according to respective ascending magnitudes, realizations of the first bit value, the second bit value, and one or more additional bit values corresponding to one or more additional constellation points are sorted based at least in part on descending respective probabilities, and one of the first bit value, the second bit value, and the one or more additional bit values having a relatively greatest probability of the respective probabilities is mapped to one of the first constellation point, the second constellation point, and the one or more additional constellation points having a relatively smallest magnitude.

In some examples, the first constellation point and the second constellation point are defined on the constellation graph based on an amplitude.

Figure 11:
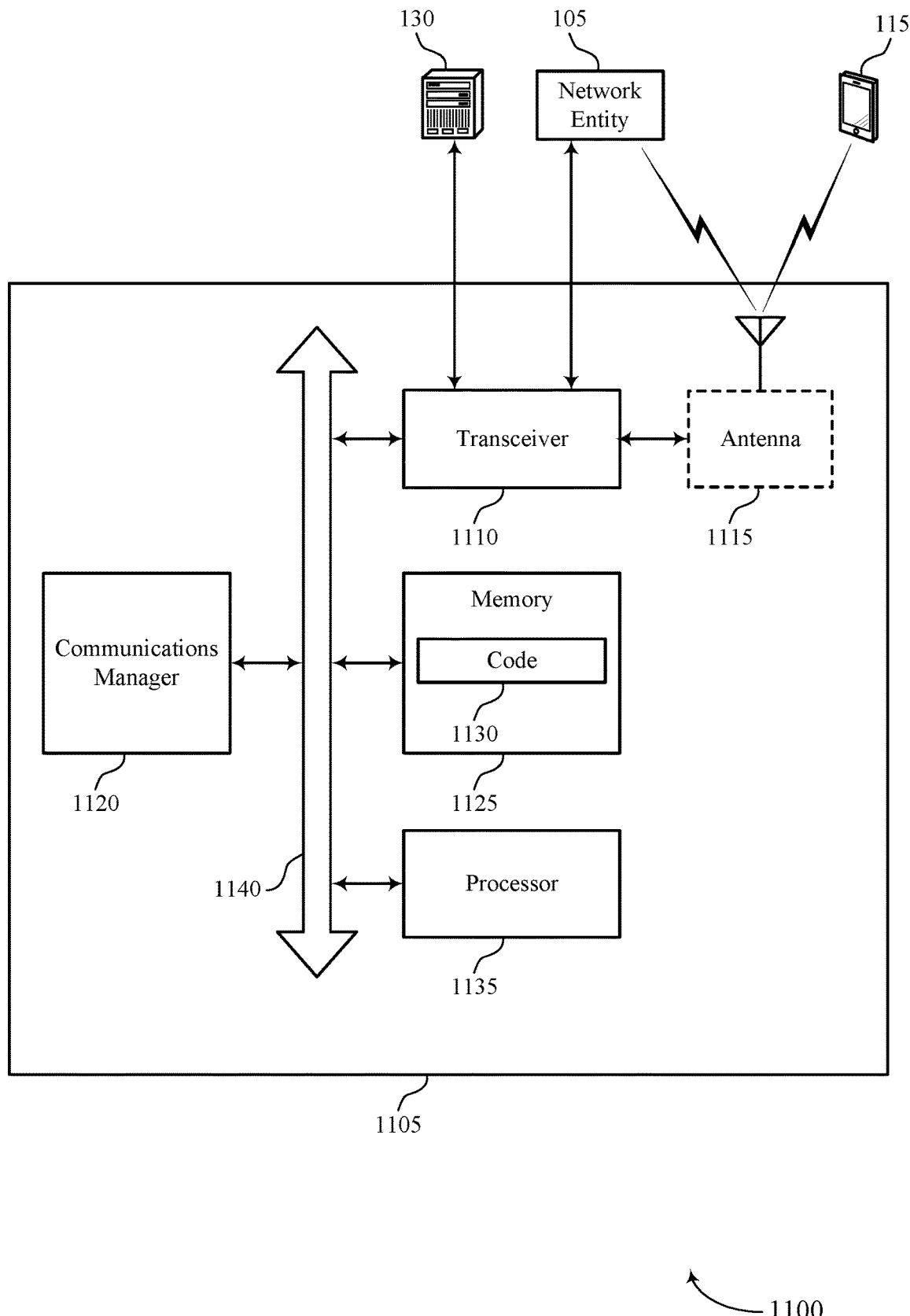
FIG. 11 shows a diagram of a system including a device that supports communicating nonuniform sources using systematic codes in accordance with one or more aspects of the present disclosure.

FIG. 11 shows a diagram of a system 1100 including a device 1105 that supports communicating nonuniform sources using systematic codes in accordance with one or more aspects of the present disclosure. The device 1105 may be an example of or include components of a device 805, a device 905, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting communicating nonuniform sources using systematic codes). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network entities 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for receiving a message including a set of multiple systematic bits modulated according to an asymmetric modulation rule. The communications manager 1120 is capable of, configured to, or operable to support a means for demodulating the set of multiple systematic bits according to the asymmetric modulation rule, where a first bit value corresponds to a first constellation point on a constellation graph and a second bit value corresponds to a second constellation point on the constellation graph that is relatively closer to a center of the constellation graph than the first constellation point. The communications manager 1120 is capable of, configured to, or operable to support a means for decoding the set of multiple systematic bits for the message, where the set of multiple systematic bits are nonuniformly distributed over a time period such that the first bit value has a first probability of occurrence during the time period and the second bit value has a second probability of occurrence during the time period that is greater than the first probability of the occurrence, where the second constellation point on the constellation graph is relatively closer to the center of the constellation graph than the first constellation point based on the second probability being greater than the first probability.

By including or configuring the communications manager 1120 in accordance with examples as described herein, the device 1105 may support techniques for efficiently modulating nonuniform source bits with systematic code.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of communicating nonuniform sources using systematic codes as described herein, or the at least one processor 1135 and the at least one memory 1125 may be otherwise configured to, individually or collectively, perform or support such operations.

Figure 12:
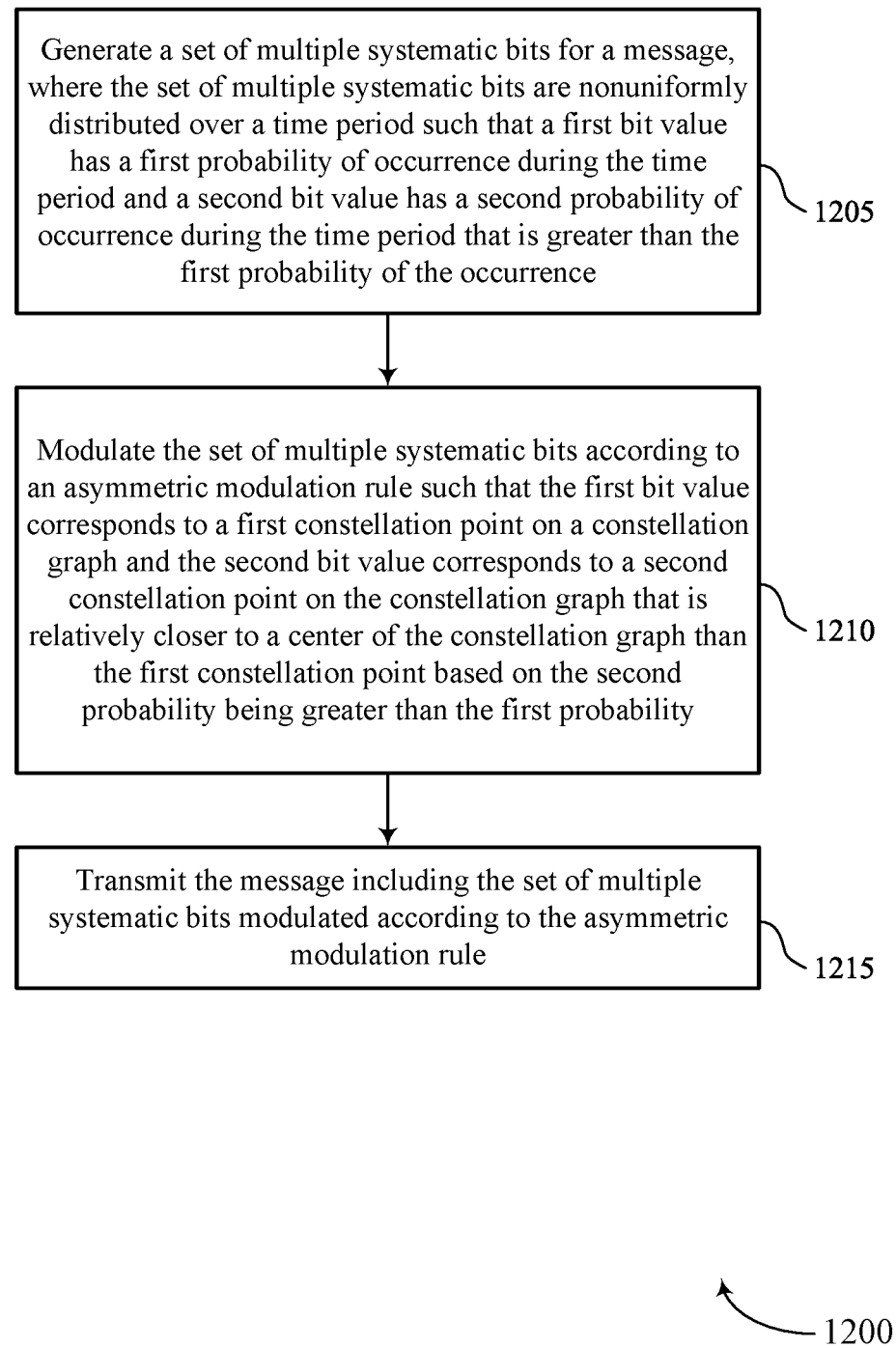
FIGS. 12 through 14 show flowcharts illustrating methods that support communicating nonuniform sources using systematic codes in accordance with one or more aspects of the present disclosure.

FIG. 12 shows a flowchart illustrating a method 1200 that supports communicating nonuniform sources using systematic codes in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include generating a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence. The operations of 1205 may be performed in accordance with examples as disclosed herein. In some examples, aspects of the operations of 1205 may be performed by a bit generation manager 625 as described with reference to FIG. 6.

At 1210, the method may include modulating the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability. The operations of 1210 may be performed in accordance with examples as disclosed herein. In some examples, aspects of the operations of 1210 may be performed by a bit modulation manager 630 as described with reference to FIG. 6.

At 1215, the method may include transmitting the message including the set of multiple systematic bits modulated according to the asymmetric modulation rule. The operations of 1215 may be performed in accordance with examples as disclosed herein. In some examples, aspects of the operations of 1215 may be performed by a message communication manager 635 as described with reference to FIG. 6.

Figure 13:
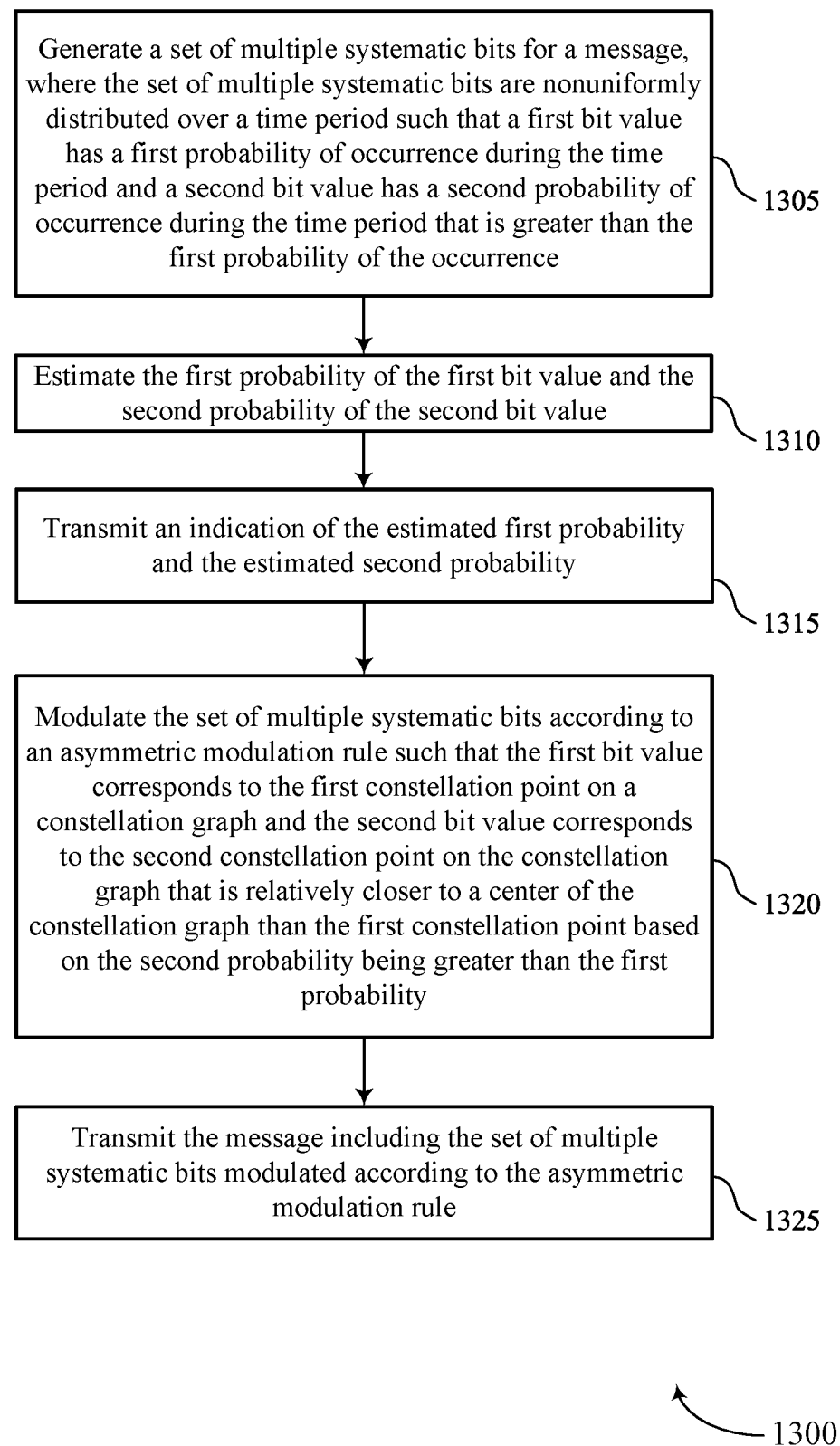

FIG. 13 shows a flowchart illustrating a method 1300 that supports communicating nonuniform sources using systematic codes in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include generating a set of multiple systematic bits for a message, where the set of multiple systematic bits are nonuniformly distributed over a time period such that a first bit value has a first probability of occurrence during the time period and a second bit value has a second probability of occurrence during the time period that is greater than the first probability of the occurrence. The operations of 1305 may be performed in accordance with examples as disclosed herein. In some examples, aspects of the operations of 1305 may be performed by a bit generation manager 625 as described with reference to FIG. 6.

At 1310, the method may include estimating the first probability of the first bit value and the second probability of the second bit value. The operations of 1310 may be performed in accordance with examples as disclosed herein. In some examples, aspects of the operations of 1310 may be performed by a bit mapping manager 640 as described with reference to FIG. 6.

At 1315, the method may include transmitting an indication of the estimated first probability and the estimated second probability. The operations of 1315 may be performed in accordance with examples as disclosed herein. In some examples, aspects of the operations of 1315 may be performed by a bit mapping manager 640 as described with reference to FIG. 6.

At 1320, the method may include modulating the set of multiple systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based on the second probability being greater than the first probability. The operations of 1320 may be performed in accordance with examples as disclosed herein. In some examples, aspects of the operations of 1320 may be performed by a bit modulation manager 630 as described with reference to FIG. 6.

At 1325, the method may include transmitting the message including the set of multiple systematic bits modulated according to the asymmetric modulation rule. The operations of 1325 may be performed in accordance with examples as disclosed herein. In some examples, aspects of the operations of 1325 may be performed by a message communication manager 635 as described with reference to FIG. 6.

Figure 14:
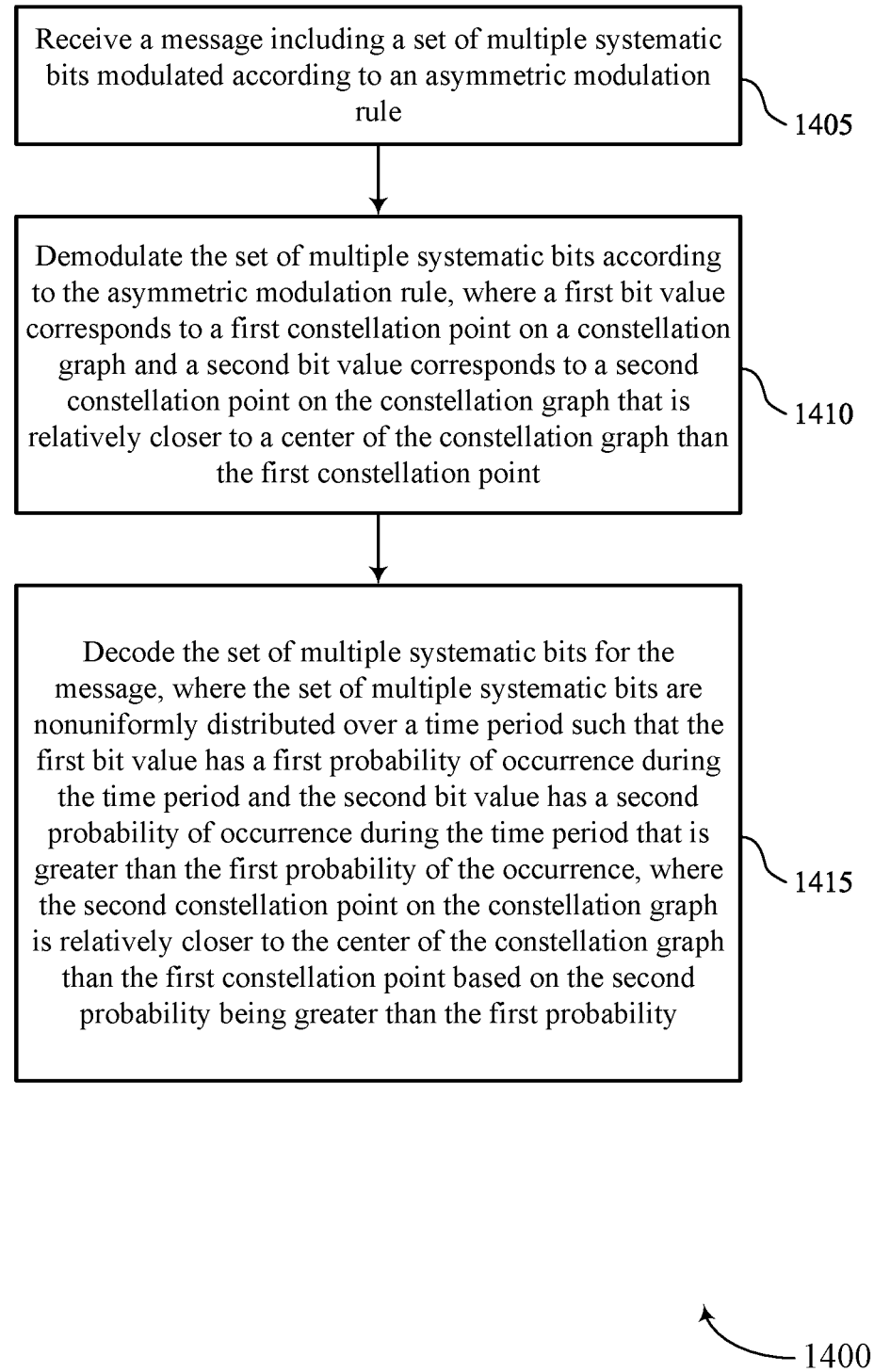

FIG. 14 shows a flowchart illustrating a method 1400 that supports communicating nonuniform sources using systematic codes in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include receiving a message including a set of multiple systematic bits modulated according to an asymmetric modulation rule. The operations of 1405 may be performed in accordance with examples as disclosed herein. In some examples, aspects of the operations of 1405 may be performed by a message communication manager 1025 as described with reference to FIG. 10.

At 1410, the method may include demodulating the set of multiple systematic bits according to the asymmetric modulation rule, where a first bit value corresponds to a first constellation point on a constellation graph and a second bit value corresponds to a second constellation point on the constellation graph that is relatively closer to a center of the constellation graph than the first constellation point. The operations of 1410 may be performed in accordance with examples as disclosed herein. In some examples, aspects of the operations of 1410 may be performed by a bit demodulation manager 1030 as described with reference to FIG. 10.

At 1415, the method may include decoding the set of multiple systematic bits for the message, where the set of multiple systematic bits are nonuniformly distributed over a time period such that the first bit value has a first probability of occurrence during the time period and the second bit value has a second probability of occurrence during the time period that is greater than the first probability of the occurrence, where the second constellation point on the constellation graph is relatively closer to the center of the constellation graph than the first constellation point based on the second probability being greater than the first probability. The operations of 1415 may be performed in accordance with examples as disclosed herein. In some examples, aspects of the operations of 1415 may be performed by a bit decoding manager 1035 as described with reference to FIG. 10.

The following provides an overview of aspects of the present disclosure:

- Aspect 1: A method for wireless communications at a transmitter, comprising: generating a plurality of systematic bits for a message, wherein the plurality of systematic bits are nonuniformly distributed over a time period such that a first bit value has a first probability of occurrence during the time period and a second bit value has a second probability of occurrence during the time period that is greater than the first probability of the occurrence; modulating the plurality of systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based at least in part on the second probability being greater than the first probability; and transmitting the message comprising the plurality of systematic bits modulated according to the asymmetric modulation rule.
- Aspect 2: The method of aspect 1, further comprising: mapping the first bit value to the first probability; and mapping the second bit value to the second probability, wherein the first bit value corresponds to the first constellation point and the second bit value corresponds to the second constellation point based at least in part on mappings.
- Aspect 3: The method of any of aspects 1 through 2, further comprising: computing a measure of the first probability of the first bit value and a measure of the second probability of the second bit value; and transmitting an indication of the measure of the first probability and the measure of the second probability.
- Aspect 4: The method of aspect 3, wherein transmitting the indication further comprises: transmitting the indication of the measure of the first probability and the measure of the second probability using a quantity of bits less than the plurality of systematic bits.
- Aspect 5: The method of any of aspects 1 through 4, further comprising: estimating the first probability of the first bit value and the second probability of the second bit value; and transmitting an indication of the estimated first probability and the estimated second probability.
- Aspect 6: The method of any of aspects 1 through 5, wherein the plurality of systematic bits nonuniformly distributed comprise one or more bits indicating an acknowledgement and one or more bits indicating a negative acknowledgement associated with a hybrid automatic repeat request feedback process.
- Aspect 7: The method of any of aspects 1 through 6, further comprising: modulating a plurality of parity bits according to a symmetric modulation rule such that a third bit value may have a third probability of occurrence during the time period and a fourth bit value may have a fourth probability of occurrence during the time period that may be equal to the third probability of the occurrence, where the third bit value corresponds to a third constellation point on the constellation graph and the fourth bit value corresponds to a fourth constellation point on the constellation graph that is equal distance to a center of the constellation graph as the third constellation point based at least in part on the fourth probability being equal to the third probability; and transmitting the message comprising the plurality of parity bits modulated according to the symmetric modulation rule.
- Aspect 8: The method of aspect 7, wherein the plurality of systematic bits are modulated onto a first axis of the constellation graph and the plurality of parity bits are modulated onto a second axis of the constellation graph.
- Aspect 9: The method of any of aspects 7 through 8, further comprising: sorting the first constellation point, the second constellation point, the third constellation point, and the fourth constellation point according to respective ascending magnitudes; sorting realizations of the first bit value, the second bit value, the third bit value, and the fourth bit value based at least in part on descending respective probabilities; and mapping one of the first bit value, the second bit value, the third bit value, and the fourth bit value having a relatively greatest probability of the respective probabilities to one of the first constellation point, the second constellation point, the third constellation point, and the fourth constellation point having a relatively smallest magnitude.
- Aspect 10: The method of aspect 9, wherein the first constellation point and the second constellation point are defined on the constellation graph based at least in part on an amplitude.

Aspect 11: A method for wireless communications at a receiver, comprising: receiving a message comprising a plurality of systematic bits modulated according to an asymmetric modulation rule; demodulating the plurality of systematic bits according to the asymmetric modulation rule, wherein a first bit value corresponds to a first constellation point on a constellation graph and a second bit value corresponds to a second constellation point on the constellation graph that is relatively closer to a center of the constellation graph than the first constellation point; and decoding the plurality of systematic bits for the message, wherein the plurality of systematic bits are nonuniformly distributed over a time period such that the first bit value has a first probability of occurrence during the time period and the second bit value has a second probability of occurrence during the time period that is greater than the first probability of the occurrence, wherein the second constellation point on the constellation graph is relatively closer to the center of the constellation graph than the first constellation point based at least in part on the second probability being greater than the first probability.

Aspect 12: The method of aspect 11, wherein the first bit value is mapped to the first probability and the second bit value is mapped to the second probability, the first bit value corresponds to a first constellation point and the second bit value corresponds to the second constellation point based at least in part on mappings.

Aspect 13: The method of any of aspects 11 through 12, further comprising: receiving an indication of a measure of the first probability of the first bit value and a measure of the second probability of the second bit value.

Aspect 14: The method of aspect 13, wherein receiving the indication further comprises: receiving the indication of the measure of the first probability and the measure of the second probability via a quantity of bits less than the plurality of systematic bits.

Aspect 15: The method of any of aspects 11 through 14, further comprising: receiving an indication of an estimated first probability of the first bit value and an estimated second probability of the second bit value.

Aspect 16: The method of any of aspects 11 through 15, wherein the plurality of systematic bits nonuniformly distributed comprise one or more bits indicating an acknowledgement and one or more bits indicating a negative acknowledgement associated with a hybrid automatic repeat request feedback process.

Aspect 17: The method of any of aspects 11 through 16, further comprising: receiving the message comprising a plurality of parity bits modulated according to a symmetric modulation rule; and demodulating the plurality of parity bits according to the symmetric modulation rule such that a third bit value corresponds to a third constellation point on the constellation graph and a fourth bit value corresponds to a fourth constellation point on the constellation graph that is equal distance to a center of the constellation graph as the third constellation point based at least in part on a fourth probability of the fourth bit value being equal to a third probability of the third bit value.

Aspect 18: The method of aspect 17, wherein the plurality of systematic bits are modulated onto a first axis of the constellation graph and the plurality of parity bits are modulated onto a second axis of the constellation graph.

Aspect 19: The method of any of aspects 17 through 18, wherein the first constellation point, the second constellation point, the third constellation point, and the fourth constellation point are sorted according to respective ascending magnitudes; realizations of the first bit value, the second bit value, the third bit value, and the fourth bit value are sorted based at least in part on descending respective probabilities; and one of the first bit value, the second bit value, the third bit value, and the fourth bit value having a relatively greatest probability of the respective probabilities is mapped to one of the first constellation point, the second constellation point, the third constellation point, and the fourth constellation point having a relatively smallest magnitude.

Aspect 20: The method of aspect 19, wherein the first constellation point and the second constellation point are defined on the constellation graph based at least in part on an amplitude.

Aspect 21: A transmitter for wireless communications, comprising one or more memories storing processor-executable code, and one or more processors coupled with the one or more memories and individually or collectively operable to execute the code to cause the transmitter to perform a method of any of aspects 1 through 10.

Aspect 22: A transmitter for wireless communications, comprising at least one means for performing a method of any of aspects 1 through 10.

Aspect 23: A non-transitory computer-readable medium storing code for wireless communications, the code comprising instructions executable by one or more processors to perform a method of any of aspects 1 through 10.

Aspect 24: A receiver for wireless communications, comprising one or more memories storing processor-executable code, and one or more processors coupled with the one or more memories and individually or collectively operable to execute the code to cause the receiver to perform a method of any of aspects 11 through 20.

Aspect 25: A receiver for wireless communications, comprising at least one means for performing a method of any of aspects 11 through 20.

Aspect 26: A non-transitory computer-readable medium storing code for wireless communications, the code comprising instructions executable by one or more processors to perform a method of any of aspects 11 through 20.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A transmitter, comprising:
one or more memories storing processor-executable code; and
one or more processors coupled with the one or more memories and individually or collectively operable to execute the code to cause the transmitter to:
generate a plurality of systematic bits for a message, wherein the plurality of systematic bits are nonuniformly distributed over a time period such that a first bit value has a first probability of occurrence during the time period and a second bit value has a second probability of occurrence during the time period that is greater than the first probability of the occurrence;
modulate the plurality of systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based at least in part on the second probability being greater than the first probability; and
transmit the message comprising the plurality of systematic bits modulated according to the asymmetric modulation rule.

2. The transmitter of claim 1, wherein:
the first bit value having the first probability is mapped to the first constellation point according to a first expression comprising a square root of a difference between one and the first probability divided by the first probability, and
and the second bit value having the second probability is mapped to the second constellation point according to a second expression comprising a negative of the square root of the first probability divided by the difference between one and the first probability.

3. The transmitter of claim 1, wherein the one or more processors are individually or collectively further operable to execute the code to cause the transmitter to:
compute a measure of the first probability of the first bit value and a measure of the second probability of the second bit value; and
transmit an indication of the measure of the first probability and the measure of the second probability.

4. The transmitter of claim 3, wherein, to transmit the indication, the one or more processors are individually or collectively further operable to execute the code to cause the transmitter to:
transmit the indication of the measure of the first probability and the measure of the second probability using a quantity of bits less than the plurality of systematic bits.

5. The transmitter of claim 1, wherein the one or more processors are individually or collectively further operable to execute the code to cause the transmitter to:
estimate the first probability of the first bit value and the second probability of the second bit value; and
transmit an indication of the estimated first probability and the estimated second probability.

6. The transmitter of claim 1, wherein the plurality of systematic bits nonuniformly distributed comprise one or more bits indicating an acknowledgement and one or more bits indicating a negative acknowledgement associated with a hybrid automatic repeat request feedback process.

7. The transmitter of claim 1, wherein the one or more processors are individually or collectively further operable to execute the code to cause the transmitter to:
modulate a plurality of parity bits according to a symmetric modulation rule such that a third bit value has a third probability of occurrence during the time period and a fourth bit value has a fourth probability of occurrence during the time period that is equal to the third probability of the occurrence, wherein the third bit value corresponds to a third constellation point on the constellation graph and the fourth bit value corresponds to a fourth constellation point on the constellation graph that is equal distance to a center of the constellation graph as the third constellation point based at least in part on the fourth probability being equal to the third probability; and
transmit the message comprising the plurality of parity bits modulated according to the symmetric modulation rule.

8. The transmitter of claim 7, wherein the plurality of systematic bits are modulated onto a first axis of the constellation graph and the plurality of parity bits are modulated onto a second axis of the constellation graph.

9. The transmitter of claim 1, wherein the one or more processors are individually or collectively further operable to execute the code to cause the transmitter to:
sort the first constellation point, the second constellation point, and one or more additional constellation points according to respective ascending magnitudes;
sort realizations of the first bit value, the second bit value, and one or more additional bit values corresponding to the one or more additional constellation points based at least in part on descending respective probabilities; and
map one of the first bit value, the second bit value, and the one or more additional bit values having a relatively greatest probability of the respective probabilities to one of the first constellation point, the second constellation point, and the one or more additional constellation points have a relatively smallest magnitude.

10. The transmitter of claim 9, wherein the first constellation point and the second constellation point are defined on the constellation graph based at least in part on an amplitude.

11. A receiver, comprising:
one or more memories storing processor-executable code; and
one or more processors coupled with the one or more memories and individually or collectively operable to execute the code to cause the receiver to:
receive a message comprising a plurality of systematic bits modulated according to an asymmetric modulation rule;
demodulate the plurality of systematic bits according to the asymmetric modulation rule, wherein a first bit value corresponds to a first constellation point on a constellation graph and a second bit value corresponds to a second constellation point on the constellation graph that is relatively closer to a center of the constellation graph than the first constellation point; and
decode the plurality of systematic bits for the message, wherein the plurality of systematic bits are nonuniformly distributed over a time period such that the first bit value has a first probability of occurrence during the time period and the second bit value has a second probability of occurrence during the time period that is greater than the first probability of the occurrence, wherein the second constellation point on the constellation graph is relatively closer to the center of the constellation graph than the first constellation point based at least in part on the second probability being greater than the first probability.

12. The receiver of claim 11, wherein:
the first bit value having the first probability is mapped to the first constellation point according to a first expression comprising a square root of a difference between one and the first probability divided by the first probability, and
and the second bit value having the second probability is mapped to the second constellation point according to a second expression comprising a negative of the square root of the first probability divided by the difference between one and the first probability.

13. The receiver of claim 11, wherein the one or more processors are individually or collectively further operable to execute the code to cause the receiver to:
receive an indication of a measure of the first probability of the first bit value and a measure of the second probability of the second bit value.

14. The receiver of claim 13, wherein, to receive the indication, the one or more processors are individually or collectively further operable to execute the code to cause the receiver to:
receive the indication of the measure of the first probability and the measure of the second probability via a quantity of bits less than the plurality of systematic bits.

15. The receiver of claim 11, wherein the one or more processors are individually or collectively further operable to execute the code to cause the receiver to:
receive an indication of an estimated first probability of the first bit value and an estimated second probability of the second bit value.

16. The receiver of claim 11, wherein the plurality of systematic bits nonuniformly distributed comprise one or more bits indicating an acknowledgement and one or more bits indicating a negative acknowledgement associated with a hybrid automatic repeat request feedback process.

17. The receiver of claim 11, wherein the one or more processors are individually or collectively further operable to execute the code to cause the receiver to:
receive the message comprising a plurality of parity bits modulated according to a symmetric modulation rule; and
demodulate the plurality of parity bits according to the symmetric modulation rule such that a third bit value corresponds to a third constellation point on the constellation graph and a fourth bit value corresponds to a fourth constellation point on the constellation graph that is equal distance to a center of the constellation graph as the third constellation point based at least in part on a fourth probability of the fourth bit value being equal to a third probability of the third bit value.

18. The receiver of claim 17, wherein the plurality of systematic bits are modulated onto a first axis of the constellation graph and the plurality of parity bits are modulated onto a second axis of the constellation graph.

19. The receiver of claim 11, wherein:
the first constellation point, the second constellation point, and one or more additional constellation points are sorted according to respective ascending magnitudes;
realizations of the first bit value, the second bit value, and one or more additional bit values corresponding to one or more additional constellation points are sorted based at least in part on descending respective probabilities; and
one of the first bit value, the second bit value, and the one or more additional bit values having a relatively greatest probability of the respective probabilities is mapped to one of the first constellation point, the second constellation point, and the one or more additional constellation points having a relatively smallest magnitude.

20. The receiver of claim 19, wherein the first constellation point and the second constellation point are defined on the constellation graph based at least in part on an amplitude.

21. A method for wireless communications at a transmitter, comprising:
generating a plurality of systematic bits for a message, wherein the plurality of systematic bits are nonuniformly distributed over a time period such that a first bit value has a first probability of occurrence during the time period and a second bit value has a second probability of occurrence during the time period that is greater than the first probability of the occurrence;
modulating the plurality of systematic bits according to an asymmetric modulation rule such that the first bit value corresponds to a first constellation point on a constellation graph and the second bit value corresponds to a second constellation point on the constellation graph that is relatively closer to a center of the constellation graph than the first constellation point based at least in part on the second probability being greater than the first probability; and
transmitting the message comprising the plurality of systematic bits modulated according to the asymmetric modulation rule.

22. The method of claim 21, wherein:
the first bit value having the first probability is mapped to the first constellation point according to a first expression comprising a square root of a difference between one and the first probability divided by the first probability, and
and the second bit value having the second probability is mapped to the second constellation point according to a second expression comprising a negative of the square root of the first probability divided by the difference between one and the first probability.

23. The method of claim 21, further comprising:
computing a measure of the first probability of the first bit value and a measure of the second probability of the second bit value; and
transmitting an indication of the measure of the first probability and the measure of the second probability.

24. The method of claim 23, wherein transmitting the indication further comprises:
transmitting the indication of the measure of the first probability and the measure of the second probability using a quantity of bits less than the plurality of systematic bits.

25. The method of claim 21, further comprising:
estimating the first probability of the first bit value and the second probability of the second bit value; and
transmitting an indication of the estimated first probability and the estimated second probability.

26. A method for wireless communications at a receiver, comprising:
receiving a message comprising a plurality of systematic bits modulated according to an asymmetric modulation rule;
demodulating the plurality of systematic bits according to the asymmetric modulation rule, wherein a first bit value corresponds to a first constellation point on a constellation graph and a second bit value corresponds to a second constellation point on the constellation graph that is relatively closer to a center of the constellation graph than the first constellation point; and
decoding the plurality of systematic bits for the message, wherein the plurality of systematic bits are nonuniformly distributed over a time period such that the first bit value has a first probability of occurrence during the time period and the second bit value has a second probability of occurrence during the time period that is greater than the first probability of the occurrence, wherein the second constellation point on the constellation graph is relatively closer to the center of the constellation graph than the first constellation point based at least in part on the second probability being greater than the first probability.

27. The method of claim 26, wherein the plurality of systematic bits nonuniformly distributed comprise one or more bits indicating an acknowledgement and one or more bits indicating a negative acknowledgement associated with a hybrid automatic repeat request feedback process.

28. The method of claim 26, further comprising:
receiving the message comprising a plurality of parity bits modulated according to a symmetric modulation rule; and
demodulating the plurality of parity bits according to the symmetric modulation rule such that a third bit value corresponds to a third constellation point on the constellation graph and a fourth bit value corresponds to a fourth constellation point on the constellation graph that is equal distance to a center of the constellation graph as the third constellation point based at least in part on a fourth probability of the fourth bit value being equal to a third probability of the third bit value.

29. The method of claim 28, wherein the plurality of systematic bits are modulated onto a first axis of the constellation graph and the plurality of parity bits are modulated onto a second axis of the constellation graph.

30. The method of claim 26, wherein:
the first constellation point, the second constellation point, and one or more additional constellation points are sorted according to respective ascending magnitudes;
realizations of the first bit value, the second bit value, and one or more additional bit values corresponding to one or more additional constellation points are sorted based at least in part on descending respective probabilities; and
one of the first bit value, the second bit value, and the one or more additional bit values having a relatively greatest probability of the respective probabilities is mapped to one of the first constellation point, the second constellation point, and the one or more additional constellation points having a relatively smallest magnitude.

* * * * *